US007149713B2

(12) United States Patent
Bove et al.

(10) Patent No.: US 7,149,713 B2
(45) Date of Patent: Dec. 12, 2006

(54) SYSTEM AND METHOD FOR AUTOMATING INVESTMENT PLANNING

(75) Inventors: Steven A. Bove, Scottsdale, AZ (US); Ralph C. Wileczek, Wilmington, DE (US); Jeanne Gill, Lansdale, PA (US)

(73) Assignee: The Vanguard Group, Inc., Malvern, PA (US)

( * ) Notice: Subject to any disclaimer, the term of this patent is extended or adjusted under 35 U.S.C. 154(b) by 0 days.

(21) Appl. No.: 09/328,626

(22) Filed: Jun. 9, 1999

(65) Prior Publication Data

US 2005/0154658 A1 Jul. 14, 2005

(51) Int. Cl.
*G06F 17/60* (2006.01)

(52) U.S. Cl. .............................. 705/36; 705/35; 705/38
(58) Field of Classification Search .................. 705/36, 705/35, 38, 31
See application file for complete search history.

(56) References Cited

U.S. PATENT DOCUMENTS

| 4,334,270 | A | * | 6/1982 | Towers ........................ 364/300 |
| 4,674,044 | A | * | 6/1987 | Kalmus et al. ............. 364/408 |
| 4,751,640 | A | * | 6/1988 | Lucas et al. ................ 364/408 |
| 5,126,936 | A | | 6/1992 | Champion et al. |
| 5,132,899 | A | | 7/1992 | Fox |
| 5,388,248 | A | * | 2/1995 | Robinson et al. ........... 395/425 |
| 5,418,888 | A | * | 5/1995 | Alden .......................... 395/64 |
| 5,644,727 | A | | 7/1997 | Atkins |
| 5,774,881 | A | | 6/1998 | Friend et al. |
| 5,799,287 | A | | 8/1998 | Dembo |
| 5,812,987 | A | | 9/1998 | Luskin et al. |
| 5,819,238 | A | | 10/1998 | Fernholz |
| 5,819,263 | A | | 10/1998 | Bromley et al. |
| 5,852,811 | A | | 12/1998 | Atkins |
| 5,864,828 | A | | 1/1999 | Atkins |
| 5,884,287 | A | * | 3/1999 | Edesess ........................ 705/36 |
| 5,999,918 | A | * | 12/1999 | Williams et al. .............. 705/36 |
| 6,018,722 | A | * | 1/2000 | Ray et al. ..................... 705/36 |
| 6,021,397 | A | * | 2/2000 | Jones et al. .................. 705/36 |
| 6,161,098 | A | * | 12/2000 | Wallman ..................... 705/36 |
| 6,430,541 | B1 | * | 8/2002 | Brown et al. ................ 705/28 |
| 6,601,044 | B1 | * | 7/2003 | Wallman ..................... 705/36 |

OTHER PUBLICATIONS

Ibbotson Portfolio Strategist™ product description, Ibbotson Associates, printout from website (www.ibbotson.com/Products/software/portfolio_strategist.asp), Feb. 26, 1999 printout date, 2 pages.

(Continued)

*Primary Examiner*—Vincent Millin
*Assistant Examiner*—Daniel Felten
(74) *Attorney, Agent, or Firm*—Akin Gump Strauss Hauer & Feld, LLP

(57) ABSTRACT

A computerized scheme automates investment planning for a client. In the scheme, data regarding the client's desired asset allocation, current asset portfolio and preferred domain are input into a computer or processor. This data are used to automatically generate financial transaction recommendations for modifying the client's current asset portfolio to reach as close as possible to the desired asset allocation and the preferred domain. The recommendations include specific recommendations for selling amounts of selected current assets and specific recommendations for buying amounts of one or more investment funds. The recommendations are displayed on a summary report for review by the client or the client's financial manager, or the recommendations are electronically communicated to a trade execution computer which automatically performs the necessary transactions to execute the buy/sell recommendations. The recommendations are selected in a manner which minimizes the tax impacts and transaction costs of potential sell transactions.

62 Claims, 30 Drawing Sheets

OTHER PUBLICATIONS

"Financial Planning for the Long Term." Interview with R. W. Stevens, Principal, Vanguard Personal Financial Services, printout from website (www.vanguard.com/cgi-bin/NewsPrint/878914651) posted on Nov. 7, 1997, website hosted by Vanguard Marketing Corporation, Jan. 13, 1999 printout date, 4 pages.

"Portfolio Planning: Integrating Your 401(k) Into Your Investment Portfolio," online publication of *In the Vanguard*, Summer 1997, printout from website (www.vanguard.com/educ/newss . . . TV/1997Summer/Your401ksumm1997.html) hosted by Vanguard Marketing Corporation, Jan. 13, 1999 printout date, 2 pages.

Laderman, J.M. "First, Asset Allocation. Now, "Asset Placement"", Business Week Online: Your Money, , The McGraw-Hill Companies, Inc., Aug. 14, 1997, printout from website (www.businessweek.com/bwdaily/dnflash/august/nf70814a.htm), Jan. 13, 1997 printout date, 2 pages.

iRebal—Intelligent Balancer, printouts from beyondmontecarlo.com web site, Copyright © 2004-2007, printout date:Jan. 26, 2005, software release date is unknown, 7 pages.

Joel Bruckenstein, First Look: iRebal—"The Indelligent Rebalancer," printout from Financial Advisor Magazine web site: http://www.fa-mag.com/past_issues.php?id_content=3&idArticle=865&idPastIssue=92, printout date: Mar. 2, 2005, 2 pages.

* cited by examiner

PORTFOLIO ALLOCATIONS

| Portfolio | 1 Tax | 2 Tax | 3 Tax | 4 Tax | 5 Tax | 6 Tax | 7 Tax |
|---|---|---|---|---|---|---|---|
| Cash | 10% | 5% | | | | | |
| Stocks | | | | | | | |
| Large Mkt Index | 7% | 14% | 13% | 16% | 20% | 22% | 28% |
| Large Growth | | | 6% | 8% | 10% | 11% | 14% |
| Large Value | | | 6% | 8% | 11% | 12% | 14% |
| Total Large Mkt | 7% | 14% | 25% | 32% | 41% | 45% | 56% |
| Mid-Small Active | | | 5% | 6% | 8% | 9% | 12% |
| Mid-Small Index | 3% | 6% | 5% | 7% | 9% | 10% | 12% |
| Total Mid-Small | 3% | 6% | 10% | 13% | 17% | 19% | 24% |
| International Developed | | | | 4% | 6% | 14% | 18% |
| International Emerging Mkts. | | | | 1% | 1% | 2% | 2% |
| Total International | | | | 5% | 7% | 16% | 20% |
| Total Stocks | 10% | 20% | 35% | 50% | 65% | 80% | 100% |
| Bonds | | | | | | | |
| Short-Term | | | | | | | |
| STCorp | 58% | 40% | 17% | 13% | 10% | 3% | |
| ST Treasury | 14% | 9% | 6% | 5% | 4% | 2% | |
| Total Short-Term Bonds | 72% | 49% | 23% | 18% | 14% | 5% | |
| Intermediate Term | | | | | | | |
| IT Corp | 8% | 22% | 20% | 13% | 11% | 13% | |
| IT Treasury | | 4% | 5% | 4% | | 2% | |
| Total Intermediate-Term Bonds | 8% | 26% | 25% | 17% | 11% | 15% | |
| Long-Term/High Yield | | | | | | | |
| Long-Term Corp | | | 3% | 2% | 2% | | |
| Long-Term Treasury | | | 4% | 3% | 3% | | |
| Total Long-Term Bonds | | | 7% | 5% | 5% | | |
| High Yield Taxable | | | 10% | 10% | 5% | | |
| Total High Yield Bonds | | | 10% | 10% | 5% | | |
| Total Long-Term/High Yield Bonds | | | 17% | 15% | 10% | | |
| Total Bonds | 80% | 75% | 65% | 50% | 35% | 20% | |

*Fig. 2A*

| Portfolio | 1 Non-Tax | 2 Non-Tax | 3 Non-Tax | 4 Non-Tax | 5 Non-Tax | 6 Non-Tax |
|---|---|---|---|---|---|---|
| Cash | | | | | | |
| Stocks<br>Large Mkt Index<br>Large Growth<br>Large Value<br>Total Large Mkt | | | | | | |
| Mid-Small Active<br>Mid-Small Index<br>Total Mid-Small | | | | | | |
| International Developed<br>International Emerging Mkts.<br>Total International | | | | | | |
| Total Stocks | | | | | | |
| Bonds<br>ST Tax Exempt<br>Total Short-Term Bonds | 72%<br>72% | 49%<br>49% | 23%<br>23% | 18%<br>18% | 14%<br>14% | 5%<br>5% |
| Intermediate Term<br>IT Tax Exempt<br>Total Intermediate-Term Bonds | 8%<br>8% | 26%<br>26% | 25%<br>25% | 17%<br>17% | 11%<br>11% | 15%<br>15% |
| Long-Term/High Yield<br>Long-Term Municipal<br>Total Long-Term Bonds | | | 10%<br>10% | 10%<br>10% | 5%<br>5% | |
| High Yield Tax Exempt<br>Total High Yield Bonds | | | 7%<br>7% | 5%<br>5% | 5%<br>5% | |
| Total Long-Term/High Yield Bonds | | | 17% | 15% | 10% | |
| Total Bonds | 80% | 75% | 65% | 50% | 35% | 20% |

*Fig. 2B*

Table of Contents

CORE DATA
1. Family Members/Mailing Address
2. Employment and Tax Information
3. Investment Assets
4. Retirement Plans
5. Non-Investment Assets
6. Stock Options
7. Life Insurance
8. Liabilities
9. Additional Core Data Information

INVESTMENT PLANNING ANALYSIS
10. Financial Objectives
11. Risk Assessment
12. Past Investment Experience
13. Additional Experience

RETIREMENT PLANNING ANALYSIS
14. Retirement Analysis
15. Current and Future Income
16. Current and Future Pension Income
17. Expenses (page 1)
18. Expenses (page 2)
19. Extraordinary Expenses
20. Education Expenses
21. Additional Retirement Information

ESTATE PLANNING ANALYSIS
22. Estate planning
23. Current and Future Pension Income
24. Additional Estate Information

---

PFP Questionnaire v3.0: Core Data - Mailing Address

Client: Basic, Billy
Household ID: 112326
Questionnaire No: 83590

1. Family Members

| Last Name | First Name | MI | Birth Date | Social Security # | US Citizen? | Gender | State | Relationship |
|---|---|---|---|---|---|---|---|---|
| Basic | Billy | | | 123-37-2987 | | M | PA | Primary |
| | | | | | | | | |
| | | | | | | | | |
| | | | | | | | | |
| | | | | | | | | |

2. Mailing Address

Name: Billy Basic
Address: 123 Haddon Ave.
Line 2:
Line 3:
Line 4:
City: Haddonfield  State: NJ  Zip: 08009-
County:  Foreign ▽  Foreign Postal Code:

Phone
● Home: (609) 555-1212
○ Business:
Fax Number:
Email Address:
Foreign Phone:
Foreign Fax:

3. Marital Status
● Single  ○ Married

*Fig. 3A*

PFP Questionnaire v3.0: Core Data - Employment and Tax Information

Client: Rebal, Michael
Household ID: 112934
Questionnaire No: 04201

Table of Contents

CORE DATA
1. Family Members/Mailing Address
2. Employment and Tax Information
3. Investment Assets
4. Retirement Plans
5. Non-Investment Assets
6. Stock Options
7. Life Insurance
8. Liabilities
9. Additional Core Data Information INVESTMENT PLANNING ANALYSIS
10. Financial Objectives
11. Risk Assessment
12. Past Investment Experience
13. Additional Experience RETIREMENT PLANNING ANALYSIS
14. Retirement Analysis
15. Current and Future Income
16. Current and Future Pension Income
17. Expenses (page 1)
18. Expenses (page 2)
19. Extraordinary Expenses
20. Education Expenses
21. Additional Retirement Information ESTATE PLANNING ANALYSIS
22. Estate planning
23. Estate planning (page 2)
24. Current and Future Pension Income
25. Additional Estate Information

4. Work Status

| | Client A | Client B |
|---|---|---|
| Check if retired: | ☐ Client A is Retired | ☐ Client B is Retired |
| Work Status: | Full-Time | |
| Occupation: | Worker | |
| Employer: | Work Inc | |
| Change in work status anticipated: | ☐ Change in Client A Anticipated | ☐ Change in Client B Anticipated |
| Explain: | | |

5. Income Tax

| | Joint | | | Client A | Client B |
|---|---|---|---|---|---|
| Adjusted Gross Income: | $450,000 | | | | |
| Taxable Income: | $425,000 | | | | |
| Federal Tax Liability: | $147,000 | or | | | |
| State Income Tax Liability: | $34,000 | | | | |
| Local Income Tax Liability: | $4,250 | | | | |
| Effective Tax Rate: | | | | | |
| Marginal Tax Rate: | | | | | |

6. Check if Figures above are Typical
☐ Check if above figures are typical for this client

6. Check if Client is an Officer
☐ Client A is an officer ☐ Client A is an officer Current Year Gain: $0   Carry Forward Loss: $0

*Fig. 3B*

PFP Questionnaire v3.0: Core Data - Investment Assets

Client: Basic, Billy
Household ID: 112326
Questionnaire No: 83590

Investment Assets

| Asset | Asset Type | Owner | Market Value | Cost Basis | Reposi-tionable |
|---|---|---|---|---|---|
| Vanguard Explorer | Vanguard Fund | Billy Basic | $100,000.00 | $3,000.00 | ☑ |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

Vanguard Asset Valuation Date: _____    Total Market Value of Investment Assets: $100,000.00

Table of Contents

CORE DATA
1. Family Members/Mailing Address
2. Employment and Tax Information
3. Investment Assets
4. Retirement Plans
5. Non-Investment Assets
6. Stock Options
7. Life Insurance
8. Liabilities
9. Additional Core Data Information

INVESTMENT PLANNING ANALYSIS
10. Financial Objectives
11. Risk Assessment
12. Past Investment Experience
13. Additional Experience

RETIREMENT PLANNING ANALYSIS
14. Retirement Analysis
15. Current and Future Income
16. Current and Future Pension Income
17. Expenses (page 1)
18. Expenses (page 2)
19. Extraordinary Expenses
20. Education Expenses
21. Additional Retirement Information

ESTATE PLANNING ANALYSIS
22. Estate planning
23. Current and Future Pension Income
24. Additional Estate Information

Target Allocation

Vanguard Funds    Enter Fund ID: [ ]

| ID | Name | Class |
|---|---|---|
| 19 | Vanguard Admiral Intermedi | B3 |
| 20 | Vanguard Admiral Long-Ter | B4 |
| 12 | Vanguard Admiral Short-Ter | B2 |
| 11 | Vanguard Admiral U.S. Trea | C1 |
| 78 | Vanguard Asset Allocation | BL |
| 2 | Vanguard Balanced Index | BL |
| 314 | Vanguard Bond Index - Inter | B3 |
| 522 | Vanguard Bond Index - Lon | B4 |
| 132 | Vanguard Bond Index - Sho | B2 |
| 84 | Vanguard Bond Index - Tota | B3 |
| 100 | Vanguard CA Tax-Free - Ins | B6 |
| 75 | Vanguard CA Tax-Free - Ins | B7 |
| 62 | Vanguard CA Tax-Free - Mo | C2 |
| 82 | Vanguard Convertible Secur | S9 |
| 528 | Vanguard Employee Index | S7 |
| 65 | Vanguard Equity Income | S9 |
| 24 | Vanguard Explorer | S3 |
| 36 | Vanguard GNMA | B4 |
| 29 | Vanguard High Yield Corpo | B4 |
| 71 | Vanguard Intermediate-Ter | B3 |

Selected Funds

| ID | Name | Amount | Plan/Owner |
|---|---|---|---|
| 26 | Vanguard/Morgan Gr | ($15,000) | Sam |
| 78 | Vanguard Asset Alloc | $0.00 | Sam |
| 103 | Vanguard Tax-Manag | $10,000 | Sam-401K |
| 115 | Vanguard Horizon Fu | $0.00 | Sam |
| 129 | Vanguard Horizon Fu | $100,000 | Marge-IRA |

Total Allocated:    $95,000.00

Get Recommended Funds
- ○ Show Taxable Bonds
- ○ Show Exempt Bonds
- ● Show Both

[Clear List] [↑] [↓]

[Get Funds]

☑ Use Auto Rebalancing

[Auto Rebalancing]
[Manual Rebalancing]
[Show Current Assets]

Client SAA: [4]
Preferred SAA: [4]

[Cancel]    [Cancel]

*Fig. 5*

Manual Fund Rebalancing

| | Proposed | | Current | | Difference |
|---|---|---|---|---|---|
| | $95,000.00 | − | $2,100,000.00 | = | ($2,005,000.00) |

Current and Proposed Investment Portfolio

| Item | Asset Class | Owner | Tax Status | Current Total | Current Total% | Suggested Change (+/−) | Proposed Total | Proposed Total% | Target Total% | Basis |
|---|---|---|---|---|---|---|---|---|---|---|
| Cash Reserves ◇ | CS | | | | | | | | | |
| Stock/Cash Bal (50% Cash) | CS | Sam | Taxable | $50,000.00 | | | | | | $0.00 |
| Vanguard Money Market - Prime | CS | Marge | Taxable | $50,000.00 | | | | | | $0.00 |
| Vanguard Money Market - Prime | CS | Marge | Taxable | $50,000.00 | | | | | | $0.00 |
| Vanguard Horizon - Global Asset Alloc.(22%) | CS | Sam | Taxable | $22,000.00 | | | | | | $0.00 |
| Vanguard Asset Allocation (20%) | CS | Sam | Taxable | $20,000.00 | | | | | | $0.00 |
| Vanguard Asset Allocation (20%) | CS | Sam | Taxable | | | $0.00 | $0.00 | | | $0.00 |
| Vanguard Horizon - Global Asset Alloc.(22%) | CS | Sam | Taxable | | | $0.00 | $0.00 | | | $0.00 |
| Total - Cash Reserves ◇ | CS | | | $192,000.00 | 9.14% | | $0.00 | 0.00% | 0.00% | |
| | | | | | | | | | | |
| Total - Cash Reserves ◇ | | | | $192,000.00 | 9.14% | | $0.00 | 0.00% | 0.00% | |
| Bonds ◇ | BI | | | | | | | | | |
| Individual Bond ◇ | BI | | | | | | | | | |
| Bonds | BI | Marge | Taxable | $100,000.00 | | | | | | $0.00 |
| Stock/Bond Bal (50% Bond) | BI | Sam | Taxable | $50,000.00 | | | | | | $0.00 |
| Total - Individual Bond ◇ | BI | | | $100,000.00 | 7.14% | | $0.00 | 0.00% | 0.00% | |

All column totals are currently accurate.

Balanced Funds

| Item | Owner | Current Total | Suggested Change (+/−) | Proposed Total |
|---|---|---|---|---|
| CREF - Bond Market | Sam | $0.00 | $0.00 | $0.00 |
| CREF - Equity Index | Sam | $100,000.00 | $0.00 | $0.00 |
| CREF - Global Equities | Sam | $100,000.00 | $0.00 | $0.00 |
| CREF - Growth | Sam | $100,000.00 | $0.00 | $0.00 |

Legend
Current Assets   Subasset Class/Total   Grand Total
Proposed Assets   Asset Class/Total   Deleted Line Item

[Ok]   [Cancel]

*Fig. 6*

PORTFOLIO ALLOCATIONS

| PORTFOLIO | 1 | 2 | 3 | 4 | 5 | 6 | 7 |
|---|---|---|---|---|---|---|---|
| BONDS | 80% | 75% | 65% | 50% | 35% | 20% | 0% |
| High Yield* | 0% | 0% | 10% | 10% | 5% | 0% | 0% |
| Long-Term* | 0% | 0% | 7% | 5% | 5% | 0% | 0% |
| Intermediate-Term Index | 0% | 8% | 10% | 8% | 0% | 4% | 0% |
| Intermediate-Term Active | 8% | 18% | 15% | 9% | 11% | 11% | 0% |
| Short-Term Index | 24% | 15% | 10% | 8% | 7% | 4% | 0% |
| Short-Term Active | 48% | 34% | 13% | 10% | 7% | 1% | 0% |
| STOCKS | 10% | 20% | 35% | 50% | 65% | 80% | 100% |
| Large Market/Index | 7% | 14% | 12% | 16% | 20% | 22% | 28% |
| Large Growth | 0% | 0% | 6% | 8% | 10% | 11% | 14% |
| Large Value | 0% | 0% | 6% | 8% | 11% | 12% | 14% |
| Mid/Small Market/Index | 3% | 6% | 6% | 6% | 8% | 10% | 12% |
| Mid Active | 0% | 0% | 2% | 3% | 4% | 4% | 6% |
| Small Active | 0% | 0% | 3% | 4% | 5% | 5% | 6% |
| International-Developed | 0% | 0% | 0% | 4% | 6% | 13% | 16% |
| International-Emerging | 0% | 0% | 0% | 1% | 1% | 3% | 4% |

\* When using Municipal Bonds for portfolios 3 and 4, percentages are flipped for long-term and high-yield bonds. For portfolio 5 use 4% high-yield and 6 % long-term municipal bond.

*Fig. 7*

| Control |
|---|
| m_PreferredDomain : char[2]<br>m_MuniForInterTermBonds : boolean<br>m_MinRetirementFundBalance : ARValue<br>m_MuniForShortTermBonds : boolean<br>m_MuniForLongTermBonds : boolean<br>m_MuniForHighYield : boolean<br>m_ProduceExplanations : boolean<br>m_BusinessArea : char[4]<br>m_MinRetailFundBalance : ARValue<br>m_MinTransactionAmt : ARValue<br>m_TSMPToleranceBelow<br>m_TSMPToleranceAbove<br>m_TIPToleranceBelow<br>m_TIPToleranceAbove<br>m_CarryForwardLoss : ARValue<br>m_CurrentYearGains : ARValue<br>m_RoundingTo : int<br>m_EstimateTaxCostAssetPct<br>m_EstimateTaxCost : boolean<br>m_SAAVarianceAbove<br>m_SAAVarianceBelow<br>m_CapGainTaxRate<br>m_LegalResidenceState : char<br>m_TaxExemptDCAFund<br>m_PortfolioNumber : int<br>m_TacticalShift<br>m_PortfolioTilt<br>m_TaxAcctDCAFund<br>m_MaxAssetConstraints<br>m_MaxAssetVariable<br>m_RequiredVariables<br>m_RequiredConstraints |
| Control() |

*Fig. 9E*

Database $ m_LastFundID : String getControlVariables()
getPurchaseOrder()
getTargetTemplate()
getAssetHierarchy()
getAssets()
getEquivalentAssets()
getAllInvestmentPlans()
connect()
disconnect()
searchAsset()
updateBreakdown()
searchInvestment()
updateInvestmentChoices()
getCandidateFunds()

InvestmentPlanData getPlanId()
getTitle()
getPlanType()
getOwner()
getInvestmentRestrictedFlag()
getTaxFlag()
getRepositionDestination()
getRestrictedPlanId()
getRestrictedPlanChoices()

AssetData getAssetId()
getAssetTitle()
getCurrentValue()
getHoldAmount()
getMinimumBalance()
getCostBasis()
getRepositionIndicator()
getFundID()
getVanguardFundFlag()
getCastBasisFlag()
getInvestmentPlanNumber()
getAssetClassBreakdown()
getVendor()
getVGIFundNumber()
getAfterTaxBalance()
getLoanAmount()
getBuyAmount()
getSellAmount()
getProposedAmount()

AssetHierarchyData getAssetClass()
getParent()
getIncluded()

PurchasePreferenceData getGrouping()
getSequenceNumber()
getAssetClassCode()
taxable()

*Fig. 9F*

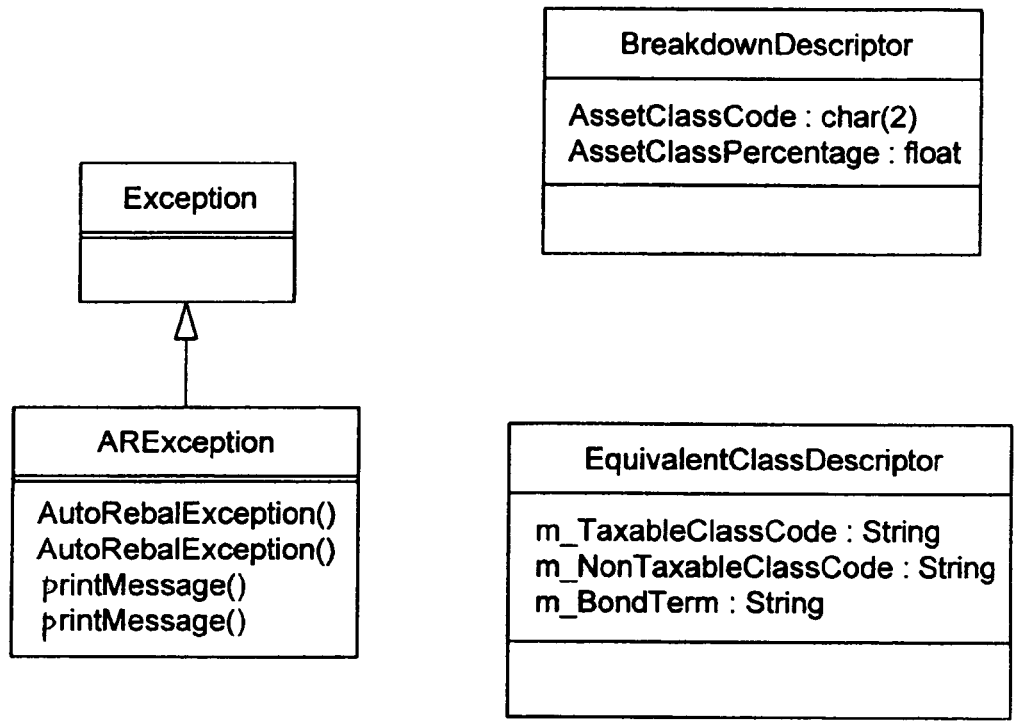
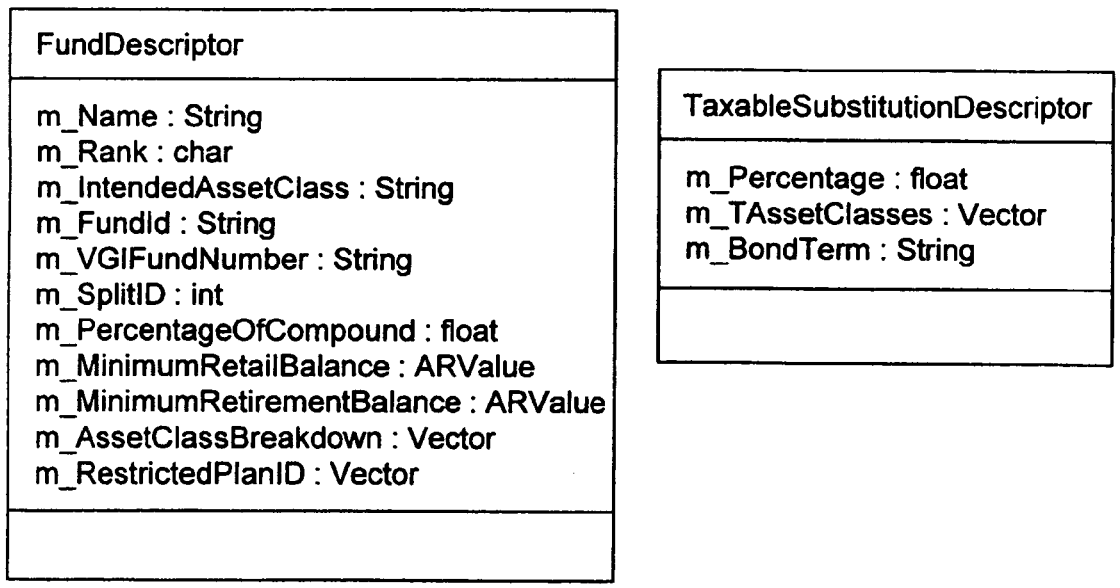
Fig. 9H

SYSTEM AND METHOD FOR AUTOMATING INVESTMENT PLANNING

BACKGROUND OF THE INVENTION

The present invention relates to automated investment planning, particularly to systems and methods which automatically generate financial transaction recommendations for modifying a client's current asset portfolio to reach as close as possible to a desired asset allocation and asset placement (i.e., preferred domain).

Personal investment planning is a complex process. Accordingly, many software products have been developed to assist individual investors, investment counselors and investment professionals in the process. Software products have been developed to select the appropriate asset allocation and portfolio of assets within each asset class. A properly managed investment portfolio must be periodically rebalanced either to maintain the investor's desired allocation or to modify the current allocation to a different allocation if the needs of the investor changes. In the rebalancing process, specific assets are bought and/or sold.

The rebalancing process is conceptually simple. For example, if an investor's portfolio becomes too heavily weighted in equities and not sufficiently weighted in bonds for the desired asset allocation, then some stock assets are sold and some bond assets are purchased. However, the problem is deciding which stock assets to sell and which bond assets to purchase. Ideally, the investor would like to rebalance the portfolio without incurring any tax implications or transaction costs. However, selling stock assets almost always has tax implications, and any buying and selling of assets incurs transaction costs which immediately decrease the total assets of the investor. Thus, it is not necessarily beneficial to fully reach the desired asset allocation if doing so would incur excessive transaction costs and/or significant negative tax implications.

The conventional process of evaluating an investor's asset portfolio for rebalancing is a very labor intensive process even when assisted by a software program. Furthermore, even an experienced investment counselor cannot mentally sort through all of the factors to be considered in the rebalancing process so as to identify the best assets to buy and sell.

Despite the sophistication of conventional investment planning tools, there is still an unmet need for a rebalancing tool which automatically generates transaction recommendations that take into account an investor's desired asset allocation, as well as the investor's preferred domain, while minimizing tax implications and transaction costs. The present invention fulfills such a need.

BRIEF SUMMARY OF THE PRESENT INVENTION

One embodiment of the present invention provides a computerized scheme for automating investment planning for a client. In the scheme, data regarding the client's desired asset allocation (also referred to herein as the "strategic asset allocation" or SAA), current asset portfolio and preferred domain (also referred to herein as "asset placement") are input into a computer or processor. This data are used to automatically generate financial transaction recommendations for modifying the client's current asset portfolio to reach as close as possible to the desired asset allocation and the preferred domain. The recommendations include specific recommendations for selling amounts of selected current assets and specific recommendations for buying amounts of one or more investment funds. The recommendations are displayed on a summary report for review by the client or the client's financial manager. Alternatively, the recommendations are used to sell amounts of selected current assets or to buy amounts of one or more investment funds. In the alternative embodiment, the recommendations may be electronically communicated to a trade execution computer which automatically performs the necessary transactions to execute the buy/sell recommendations. The recommendations may suggest that the client add specific amounts of shares to currently held mutual funds, and/or open one or more new mutual funds and contribute specific amounts of shares to the new funds.

The recommendations are selected in a manner which minimizes the tax impacts and transaction costs of potential sell transactions, and the summary report includes the tax impacts and transaction costs of at least some of the recommendations.

In the scheme, the computer also receives data regarding the client's asset portfolio preferences, including current assets that the client wishes to hold or sell, any constraints on asset selling, and the client's Ibbotson score, and this data are also used to automatically generate the financial transaction recommendations. Target portfolio amounts and adjusted target portfolio amounts are developed for each asset category in the desired asset allocation.

The client's current asset portfolio includes repositionable assets, non-repositionable assets and possibly repositionable assets. The scheme recommends holding the client's possibly repositionable assets if the client's new asset allocation will be within a predetermined percentage of the desired asset allocation, such as 3%, after selling all of the client's repositionable assets. The scheme may also treat possibly repositionable assets as non-repositionable assets when making the current asset portfolio modifications. Furthermore, the scheme may also recommend selling the client's repositionable assets until the tax cost of selling equals a predetermined percentage of the client's current asset portfolio.

The present invention also provides a computer program product including at least one computer readable medium having computer program logic recorded thereon for automating investment planning for a client in accordance with the scheme described above.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings:

FIGS. 2A and 2B show sample portfolio allocations used in explaining Part I of the disclosure below;

FIGS. 3A through 3E are client questionnaire input screens;

FIG. 4 is a screen used to initiate analysis and report creation;

FIG. 5 is a screen used to specify funds which should be added to the client's proposed portfolio;

FIG. 6 is a worksheet screen for specifying buy/sell amounts;

FIG. 7 shows additional sample portfolio allocations used in explaining Part II of the disclosure below;

FIGS. 9A through 9H show class diagrams for all of the objects used in the present invention.

DETAILED DESCRIPTION OF THE INVENTION

Figure 1A:
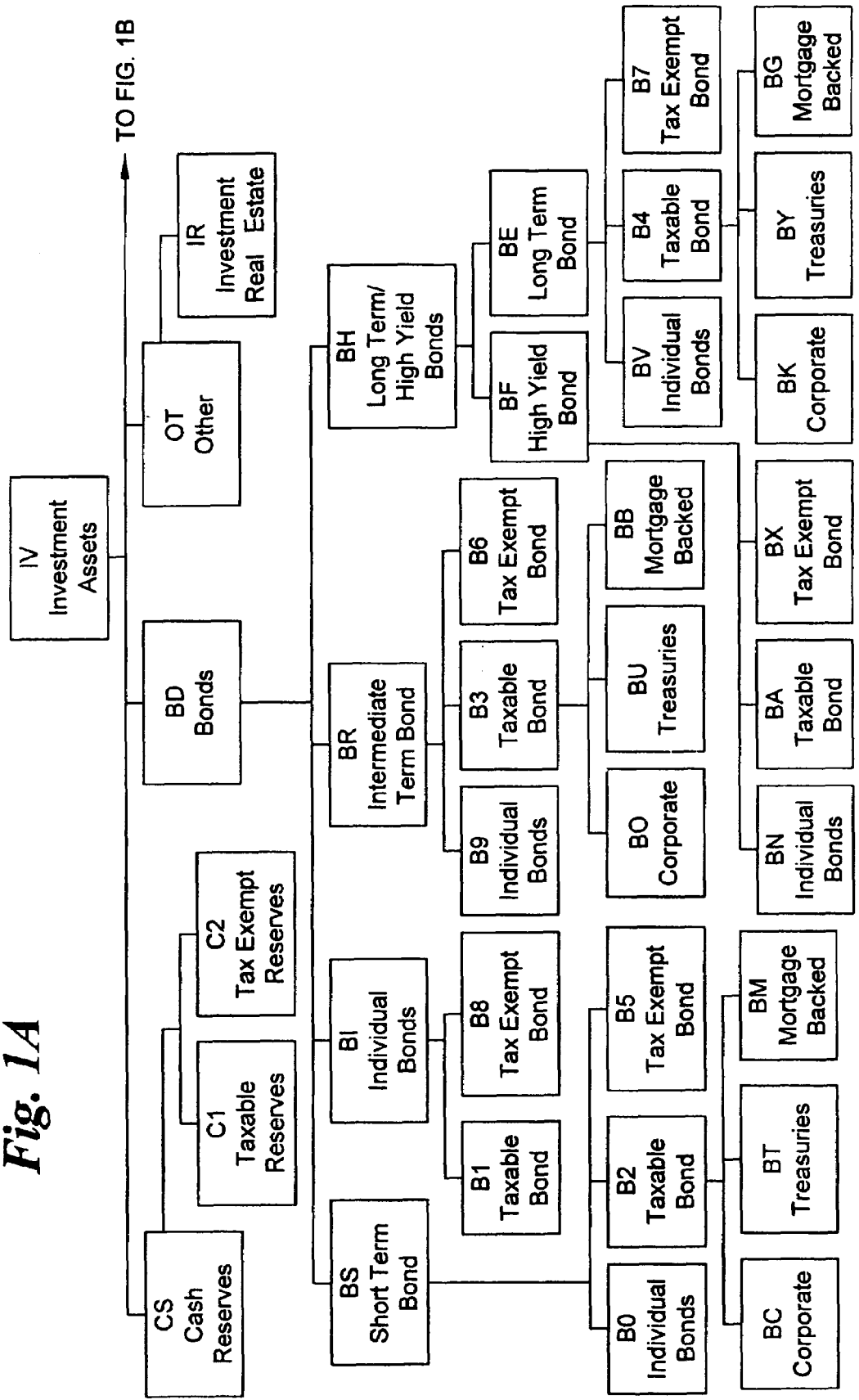
FIG. 1A and FIG. 1B, taken together, show an investment asset hierarchy for use in the present invention.

Certain terminology is used herein for convenience only and is not to be taken as a limitation on the present invention. In the drawings, the same reference letters are employed for designating the same elements throughout the several figures.

The present invention is described in the context of one or more software programs, collectively referred to as a "computer program product," for automatic rebalancing of assets. The phrase "Auto Rebal" is also used to refer to the automatic rebalancing process. The computer program product resides in one or more computer readable media having the computer logic recorded thereon, such as a magnetic or optical disk, RAM, ROM, or the like. The computer program product may be executed on any general purpose computer. When executed, the computer program product performs the functions provided by the computer program logic (i.e., software code) associated therewith.

The executed computer program product accepts input data regarding the investors, interchangeably referred to hereafter as "clients" or "customers," and provides outputs in the form of recommendations on a summary report or in the form of signals which execute automated buy/sell trades based on recommendations determined by the program. The client may interact with the executed computer program product directly, or a financial counselor may provide the inputs on behalf of the client. The description of the invention set forth below presumes that a counselor will interact with a client to provide all of the necessary input data.

Since the entire process occurs in a computerized and automated environment, the client, the computer program product, and the financial counselor (if used), may reside in the same physical location or each may be remote from one another and may communicate with each other by any suitable communication media. Furthermore, one or more portions of the computer program product may be remote from the general purpose computer which executes its software code. The present invention is thus best viewed as an automated financial service wherein the steps which are performed to provide the service and the associated physical hardware and software for performing the steps may be physically centralized or distributed in any suitable manner. The present invention may be implemented by any suitable combination of software and hardware.

The present invention is further described in the context of an automated financial service provided by a mutual fund entity, particularly, The Vanguard Group, Valley Forge, Pa. Thus, the examples provided herein which illustrate one embodiment of the present invention refer to specific Vanguard funds by their well-known fund names. The use of Vanguard funds to illustrate the invention is not intended to limit the scope of the invention in any manner. For example, most large, diversified mutual fund companies manage funds which have similar investment objectives as the funds described in the examples. Also, the funds described in the examples may be replaced with funds from a plurality of different mutual fund companies.

The example of the Vanguard automatic rebalancing process is explained in multiple parts, as follows:

PART I—Explains types of assets which are manipulated, provides sample portfolio asset allocations, shows sample client input screens and provides sample output report screens PART II—Explains the logic behind the entire process in accordance with the disclosed embodiment of the present invention.

PART III—Provides detailed, functional data flowcharts and class diagrams for the disclosed embodiment of the present invention.

APPENDIX—Provides a linear programming version of the disclosed embodiment of the present invention.

Figure 1B:
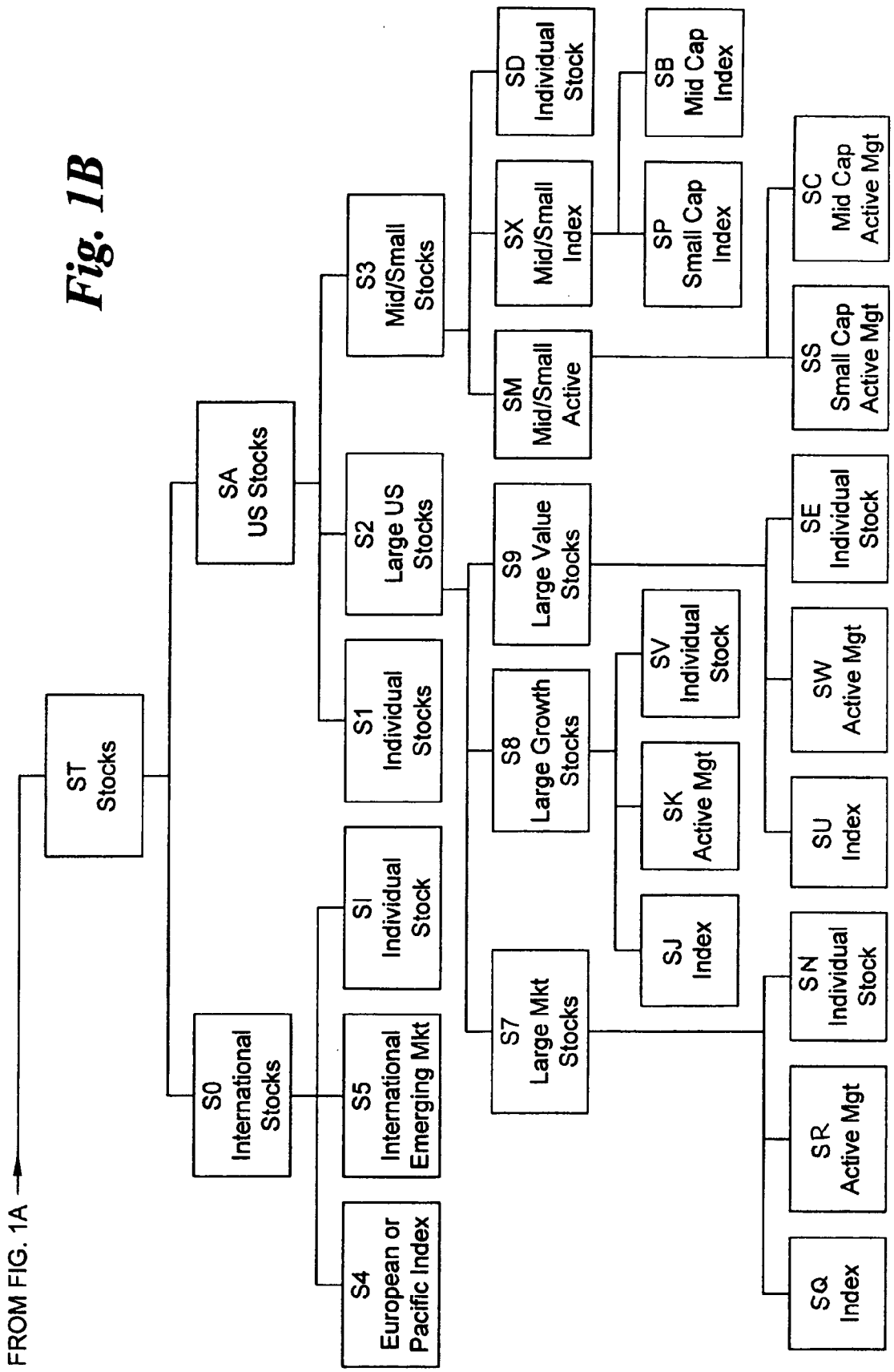

FIG. 1A and FIG. 1B, taken together, show a self-explanatory investment asset hierarchy which is necessary to understand the process. References are made to the asset hierarchy throughout the disclosure below.

FIG. 2A shows seven sample taxable portfolio allocations, and FIG. 2B shows six sample non-taxable portfolio allocations.

Part I

Auto-Rebal Sales and Purchases

Step 1—Auto-Rebal sells repositionable assets and proceeds are put in a "money market" on a per registration basis.
  a. Non-Vanguard non-repositionable assets are never sold
  b. Non-Vanguard repositionable assets are always sold
  c. Vanguard non-repositionable assets are never sold
  d. Vanguard repositionable assets may or may not be sold
  Example: A client needs $100,000 of Windsor II. Preferred domain says we need municipals in taxable accounts. The client has $100,000 of Windsor II in a taxable account. Auto-Rebal will recognize that Windsor II should be kept.

Step 2—Auto-Rebal determines strategic asset allocation and sub-asset allocation by comparing the target portfolio amounts against what is non-repositionable. The greater of the non-repositionable amount or the target amount will be used as the proposed amount.

Step 3—Auto-Rebal makes purchases
  Auto-Rebal will make purchases in the following order:
  $1^{st}$—Stocks will be purchased into a Roth IRA if available.
  $2^{nd}$—Stocks will be purchased into an annuity if available.
  $3^{rd}$—Preferred domain rules are initiated.
  a. If the client is in the 39.6% MTB, bonds will be bought first every time.
  b. If the client is not in the 39.6% tax bracket and the income stage is checked, bonds will be bought first.
  c. If the client is not in the 39.6% tax bracket and the accumulative stage is checked, stocks will be bought first.
  $4^{th}$—Taxable accounts are used to buy stocks or bonds based on the above preferred domain rules until no taxable money is left. If additional purchases are required they will be made in retirement plans.
  $5^{th}$—Purchases are made in retirement accounts (other than Roth IRAs and annuities).

a. Restricted plans (i.e., limited fund choices) are used first.
b. Non-restricted plans are used next. (If a system limitation exists, restricted plans are used last. This may cause a purchase to be made in a less than optimal fund and may require a manual adjustment. For an example, see Auto Rebal Work Arounds.)

When making purchases, Auto-Rebal will follow the stocks out bonds in hierarchy or the bonds out stocks in hierarchy, as described below. Purchases are made from the accounts with the largest dollar balance first (based on the above), to minimize the duplication of funds.

I. Stock Outside Hierarchy
   1. Large Index Purchases (50% of large)
   2. Mid/Small Index (50% of mid/small)
   3. Growth Exposure (25% of large)
   4. Value Exposure (25% of large)
   5. Active Mid Cap Exposure (25% of mid/small)
   6. Active Small Cap Exposure (25% of mid/small)
   7. International Developed
   8. International Emerging II. Stock Inside Hierarchy
   1. International Developed
   2. International Emerging
   3. Active Small Cap Exposure (25% of mid/small)
   4. Active Mid Cap Exposure (25% of mid/small)
   5. Value Exposure (25% of large)
   6. Growth Exposure (25% of large)
   7. Mid/Small Cap Index Exposure (50% of mid/small)
   8. Large Index Exposure (50% of large)

III. Bonds Outside Hierarchy
   Municipal or Corporate Bonds will be purchased based on a client's tax bracket.

The category order is illustrated below:
   A. Long-term Bond Exposure
      1. Corporate and Treasury, or
      2. Municipal
   B. High-Yield Bond Exposure
      1. Corporate, or
      2. Municipal
   C. Intermediate-Term Bond Exposure
      1. Corporate and Treasury, or
      2. Municipal
   D. Short-term Bond Exposure
      1. Corporate and Treasury, or
      2. Municipal IV. Bonds Inside Hierarchy
   A. Short-term Bond Exposure
      1. Corporate and Treasury
   B. Intermediate-Term Exposure
      1. Corporate and Treasury
   C. High-Yield Exposure
      1. Corporate
   D. Long-term Exposure
      1. Corporate and Treasury New Asset Classes
   A. Stocks
      1. Large Cap
         a. Index
         b. Active
            1. Growth
            2. Value
            3. Market
      2. Mid Cap
         a. Index
         b. Active
      3. Small Cap
         a. Index
         b. Active
   B. Bonds (across the yield curve)
      1. Corporate
      2. Treasury
      3. Mortgage Vanguard Fund Choices (Core Portfolio)
   Auto-Rebal will always purchase the preferred fund if any of the following conditions apply:
      1. The client has no funds in the asset class.
      2. The preferred fund is owned in isolation.
      3. The preferred fund is owned along with an alternate fund in the same registration.

Auto-Rebal will purchase the alternate fund if:
   1. It is the only fund owned in the asset class.
   2. If the preferred and alternate fund are owned in different registrations and preferred domain requires a purchase of the alternate fund.
   3. If it is the only available fund in the restricted plan.

For bonds, Auto-Rebal will attempt to use corporate and index funds whenever possible.
   If not possible, corporate and treasury funds will be used to achieve the appropriate corporate/treasury mix based on the portfolio in question. The "Alternate Funds" referred to below are not listed in order of preference.

I. STOCKS
   A. Large
      1. Index
         a. Preferred—500 Portfolio
         b. Alternate—Growth and Income, Trustees' Equity and Tax-Managed Growth & Income
      2. Growth
         a. Preferred—U.S. Growth
         b. Alternate—Morgan Growth and Index Growth
      3. Value
         a. Preferred—Windsor II
         b. Alternate—Equity Income and Index Value
   B. U.S. Total Stock Market (to be used when large market/index to mid/small market/index equals 70/30)
      1. Preferred—Total Stock Market
      2. Alternate—Tax-Managed Capital Appreciation
   C. Mid/Small U.S. Stocks
      1. Index
         a. Preferred—Extended Market
         b. Alternate—Index Small Cap
      2. Mid Cap Active
         a. Preferred—Horizon—Aggressive Growth
         b. Alternate—Primecap, Selected Value, Horizon—Capital Opportunity, Windsor
      3. Small Cap Active
         a. Preferred—Explorer
         b. Alternate—None
   D. International Stocks
      1. Developed
         a. Preferred—European and Pacific
         b. Alternate—None
      2. Emerging
         a. Preferred—Emerging Markets Index
         b. Alternate—None 3. Total International
   a. Preferred—European Index and Pacific Index
   b. Alternate—International Growth and Trustees' International II. BONDS
  A. High Yield
    1. Municipal
      a. Preferred—High Yield Muni
      b. Alternate—None
    2. Corporate
      a. Preferred—High Yield Corporate
      b. Alternate—None
  B. Long-term
    1. Municipal
      a. Preferred—Insured Long-term Muni or State specific Muni or State specific Muni if available
      b. Alternate—Long-term Muni
    2. Taxable
      a. Preferred—Long-term Bond Index
      b. Alternate—Long-term Corporate and Admiral Long-term U.S. Treasury or Long-term U.S. Treasury
  C. Intermediate-Term
    1. Municipal
      a. Preferred—Intermediate-Term Muni or State specific Muni
      b. Alternate—None
    2. Taxable
      a. Preferred—Intermediate-Term Bond Index and Intermediate-Term Corporate
      b. Alternate—Intermediate-Term Corporate and Admiral Intermediate-Term U.S. Treasury or Intermediate-Term U.S. Treasury
  D. Short-term
    1. Municipal
      a. Preferred—Short-term Muni (Portfolio 1) and Limited-Term and Muni (Portfolio 2–7)
      b. Alternate—Limited-Term Muni (Portfolio 1) and Short-term Muni (Portfolio 2–7)
    2. Taxable
      a. Preferred—Short-term Corporate and Short-term Bond Index
      b. Alternate—Short-term Corporate and Short-term Admiral U.S. Treasury or Short-term U.S. Treasury Vanguard Fund Choices (Annuity)

I. Stocks
  A. Large U.S. Stocks
    1. Index
      a. Preferred—Equity Index
      b. Alternate—None
    2. Growth
      a. Preferred—Growth Portfolio
      b. Alternate—None
    3. Value
      a. Preferred—Equity Income and Diversified Value
      b. Alternate—None
  B. Mid/Small U.S. Stocks
    1. Mid Cap Index
      a. Preferred—Mid Cap Index
      b. Alternate—None
    2. Small Cap Active
      a. Preferred—Small Company Growth
      b. Alternate—None
  D. International Stocks
    1. Developed and Emerging
      a. Preferred—International
      b. Alternate—None II. Bonds
  A. High Yield
    1. Corporate
      a. Preferred—High Yield Bond
      b. Alternate—None
  B. Intermediate-Term
    1. Taxable
      a. Preferred—High Grade Bond Index
      b. Alternate—None
  C. Short-Term
    1. Corporate
      a. Preferred—Short-Term Corporate
      b. Alternate—None Auto Rebal Summary After auto-rebal has produced a report, a summary is made of its conclusions. This will allow the counselor and reviewer to get an overview of the client's situation. The following is a prototype of the document and its contents:

SAA Summary:
  "The client reached the target SAA and the sub-SAA," or
  "The client reached the target SAA but was off in the following sub-categories (list the sub-asset categories where proposed does not equal target)," or
  "The client did not reach the target SAA and was off in the following sub-categories (list the asset and sub-asset categories where proposed does not equal target)."

Indexing Summary:
  Stock Indexing:
    Current=_%
    Proposed=_%
    Target=_%
  Stock Active:
    Current=_%
    Proposed=_%
    Target=_%

Growth vs. Value Summary:
  Growth Stocks:
    Current=_%
    Proposed=_%
    Target=_%
  Value Stocks:
    Current=_%
    Proposed=_%
    Target=_%

Tax Cost Summary:
  Total Tax Cost=$_
  Tax Cost as a percent of portfolio=_%

Transaction Summary:
  Total Number of Steps=_
  Total Number of Transactions=_

Fund Summary:
  Preferred Funds:
  The following preferred funds were not used: (list funds)
  Alternate Funds:
  The following alternate funds were used: (list funds)

Income Summary:
  Client Income Need=$_
  Taxable Bond Funds Generate=$_
  Surplus or Deficit=$_

Preferred Domain Summary:
    Client is an income investor or an accumulation investor or in the 39.6% MTB
        Stocks or Bonds should be outside
        Taxable Accounts:
        Stocks=_%
        Bonds=_%
        Cash Reserves=_%
        Tax-Deferred Accounts: (This includes Roth IRA's and annuities which may differ from preferred domain.)
        Stocks=_%
        Bonds=_%
        Cash Reserves=_%

Dollar-Cost Averaging Summary:
    DCA amount (proposed)=_% and $_
    DCA amount (target)=_% and $_

The Vanguard Group uses a personal financial planning (PFP) questionnaire to collect information for its clients. The present invention takes advantage of the existing questionnaire format and screens wherever possible. The discussion below highlights changes made to the existing (conventional) PFP screens to collect the data necessary to implement the present invention. Entry for all new data fields needed by Auto Rebalancing which is specific to the client was added to existing Client Questionnaire screens. If during analysis, the counselor finds that changes are needed to any of these elements, the counselor will need to exit the Analysis function and update the data through the questionnaire process. This process is the same as the update process that currently exists for updating questionnaire data.

The following sections describe the changes made to existing Questionnaire screens. Only screens which are impacted by the Auto Rebalancing project are shown.

Family Members/Mailing Address

FIG. 3A is a questionnaire screen for entering core data regarding the client's family members and mailing address. The Auto Rebalancing algorithm needs the client's legal residence state to determine which municipal bond funds should be used in the proposed portfolio. No additional fields will be needed to support this process. For Auto Rebalancing purposes, the state shown for the primary client (and not the state listed in the mailed address) will be used as the legal residence state for the client group during the rebalancing process.

This screen is modified to provide entry of state code from a drop down list of valid state codes. This will insure that the value entered will be a valid state code.

Employment and Tax Information

FIG. 3B is a questionnaire screen for entering additional core data regarding the client's employment and tax information. The following new fields were added to the PFP Questionnaire support the Auto Rebalancing project:
1. Current Year Gain
2. Carry Forward Loss Current Year Gain—This field is used to input a gain that will be included in the total cost calculation used by auto rebal in determining whether to sell a "maybe" asset. This gain amount could be the result of customer activity outside the rebalancing process or it could be the gains resulting from previous rebalancing activity during the year. The default is zero.

Carry Forward Loss—This field is used to input a loss that will be included in the total cost calculation used by auto rebal in determining whether to sell a "maybe" asset. A loss amount can be used to offset gains from the sale of assets. The default is zero.

Investment Assets

FIG. 3C is a questionnaire screen for entering additional core data regarding the client's investment assets. The Investment Assets screen is used to supply information on the client's current non-retirement investment holdings. There were no changes are being made to this screen compared to the conventional PFP screen.

An additional change will be needed when Auto Rebalancing is implemented for PAS. A new field will be needed to allow the PAS counselor to identify whether an asset should be included in the rebalancing process.

Figure 3D:
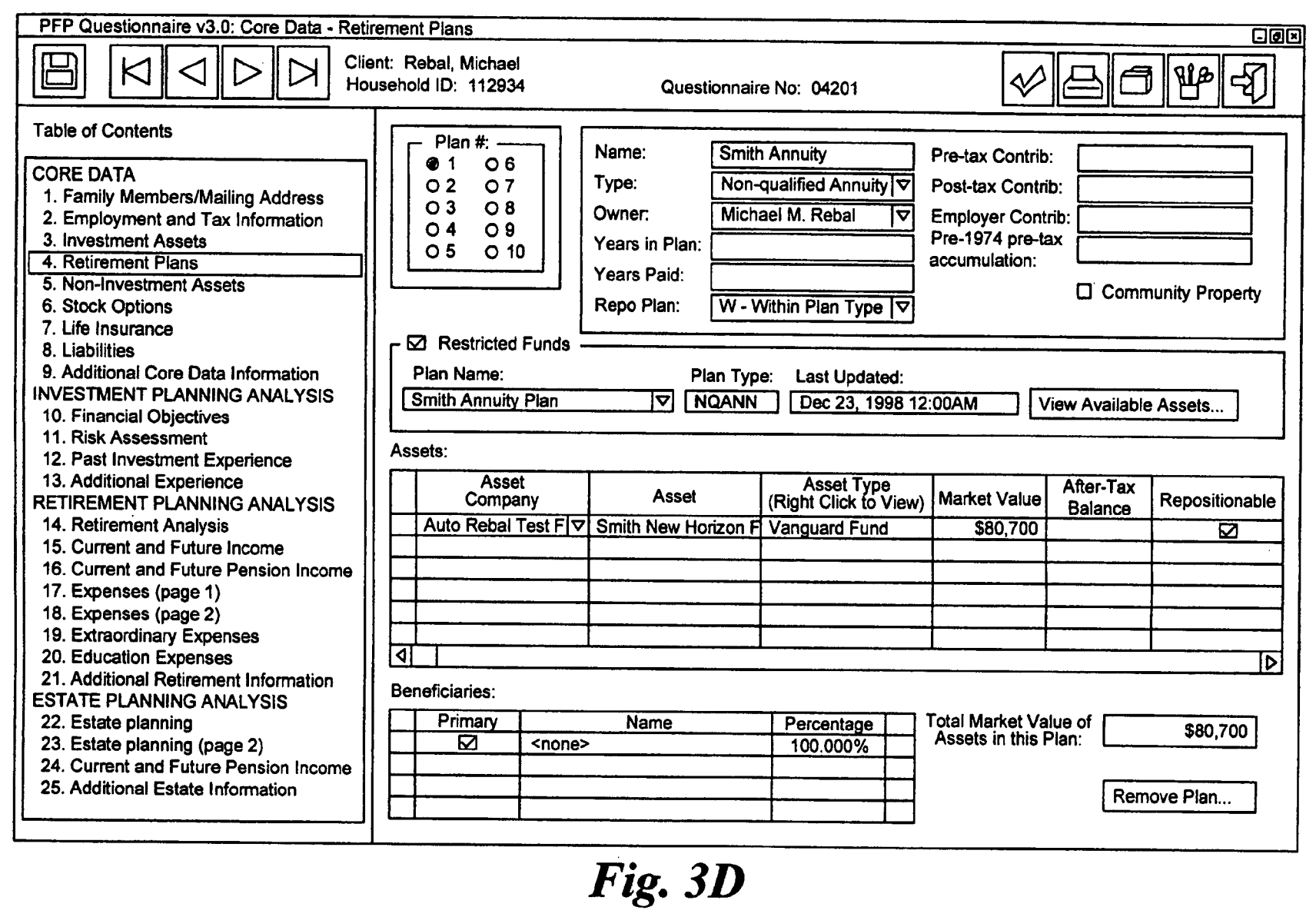

FIG. 3D is a questionnaire screen for entering additional core data regarding the client's current retirement plan holdings. This screen was modified for Auto Rebalancing to allow the counselor to do the following:
    (1) Identify the plan to which assets in the existing plan should be moved during rebalancing.
    (2) Indicate whether the plan has restricted assets.
    (3) If investment alternatives are restricted, what assets are available as investment alternatives.

The following are new fields which are added to the screen:
    (1) Repo Plan—This field contains 3 choices: Repo within same plan type, Repo to a new plan type, Do not reposition. If the Repo to a new plan type is selected, the system will determine the destination plan type based on the source plan type. The system will then look to see if there is already a plan of that type for the client. If there is, assets from the original plan will be added to the first plan for the new type plan. If there is not an existing plan of the new type for the client, the system will create a new plan for the purposes of buying assets with the proceeds of the original plan.
    (2) Restricted Funds—This is a check box used to indicate whether or not the investment choices for this plan are limited. This box will only be available when reposition within the plan is specified in Repo Plan. If the box is checked, investment options for the plan are restricted; the Plan Name drop down list will then be functional.
    (3) Plan Name, Plan Type and Last Update—These fields will only be available when Restricted Funds is checked. These are drop down list boxes showing the associated plan descriptions for which available funds have been defined. The counselor would select the correct Plan Name. The Plan Type (Annuity, 401(K), etc.) is a display only field which will show the plan type of the selected company/plan combination. The last update field will show the date of the last time this plan has been updated.

If the proper plan is not available, the counselor would need to obtain the available investment options from the client and have this information entered into the system via the Master Plan Maintenance mechanism before the plan could be completed.

The following new button was added to the screen to enable the counselor to review the investment choices available to a restricted plan:

View Available Assets—The view button is provided to enable the counselor to view and print the assets available for investment in the selected plan. This button will only be enabled when the counselor has specified yes for Restricted Funds. The system will display the assets for the plan identified in the company/plan fields.

Investment Analysis: Experience

Figure 3E:
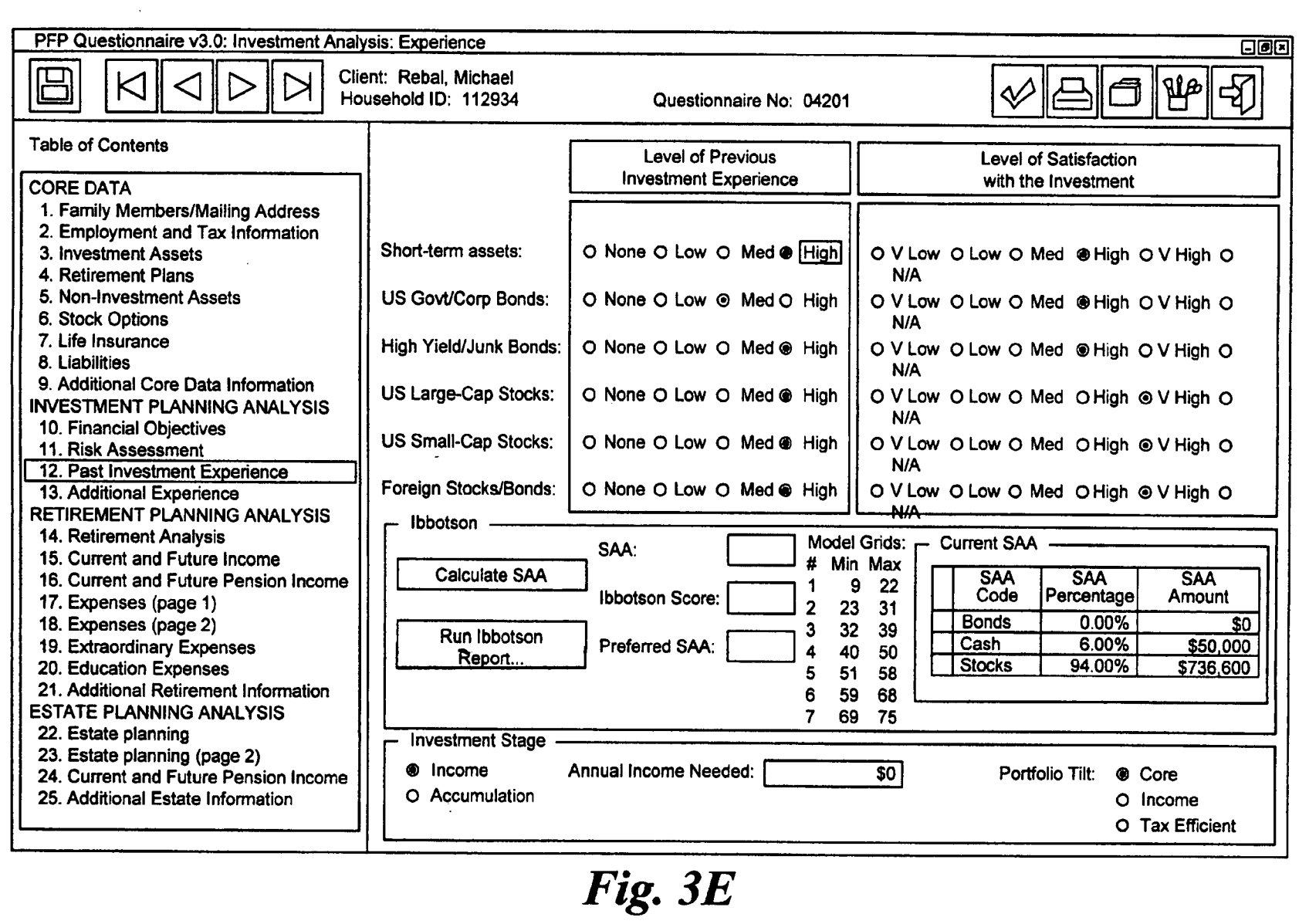

FIG. 3E is a questionnaire screen for entering data regarding the client's past investment experience. The Experience screen is the last screen within the risk quiz portion of the Questionnaire. The following new elements were added in support of the Auto Rebalancing project:

Model Grids—This area is display only. It will show the range of Ibbotson scores associated with each of the seven target portfolios.

Current SAA—This text box will display the client's current percent asset allocation and the dollar amount currently held in each asset class.

Investment Stage—Radio buttons to indicate whether the client is in the income or accumulation stage. This setting will impact the preferred domain choice for the use of bonds in taxable accounts.

Annual Income Needed—This is the annual income which must be provided by the portfolio. This field will default to zero and must be entered by the counselor if a specific amount of income is expected. This field will be entered if Investment Stage is Income. If Investment Stage is Accumulation, Annual Income Needed will be set to zero and will not be enterable.

Portfolio Tilt—This is a set of push buttons used to indicate the valid portfolio tilt to be used for the customer. The tilt will change the percent allocations for target portfolio asset classes and/or modify preferred funds. Acceptable tilts are core, income, and tax efficient.

Analysis Screen Changes

The Analysis function was modified to use Auto Rebalancing to determine the contents of the proposed portfolio. Use of Auto Rebalancing is optional.

Perform Analysis

Figure 4:
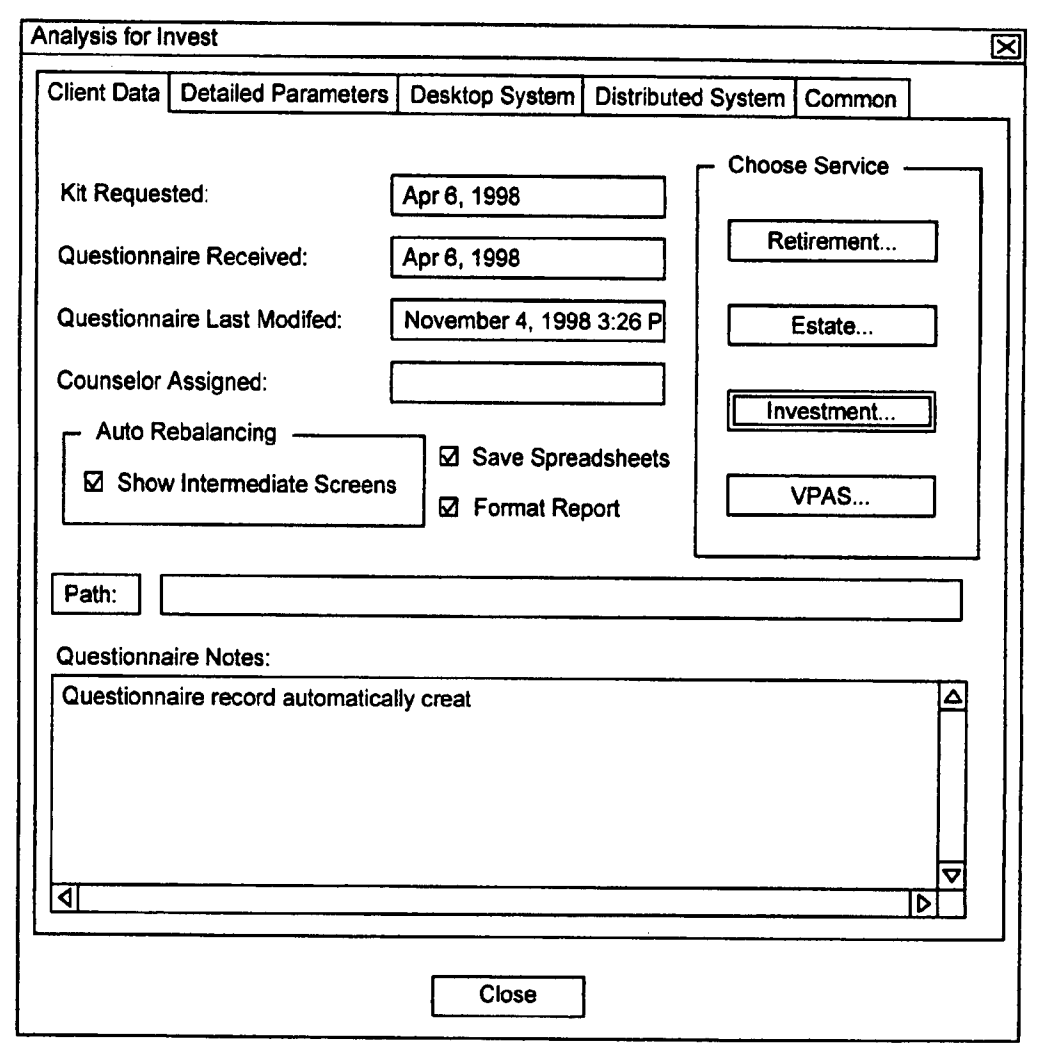

FIG. 4 is a screen used by the counselor to initiate the analysis and report creation. This screen was modified to contain an Intermediate Review check box.

Show Intermediate Screens—This check box is used to allow the report to be completed without the need for counselor intervention. If the box is checked, the system will stop at intermediate screens, prior to creating the final report. The counselor will be able to stop the process without creating the report. If the box is unchecked, the system will run through the entire flow, not stopping until the final report is complete.

For PFP, the box would default to unchecked. For PAS (Personal Advisory Service), the box will default to checked. If the box is unchecked for PAS, the system would not start the "automatic" processing until the VPAS (Vanguard Personal Advisory Service) analysis portion of the flow is completed.

Target Allocation

FIG. 5 is an existing screen currently used to specify the funds which should be added to the client's proposed portfolio. Several new buttons/boxes have been added to this screen to support Auto Rebal and the new GUI (graphical user interface) spreadsheet.

The new items are:
 (1) Use Auto Rebalancing Check Box
 (2) Auto Rebalancing Button
 (3) Manual Rebalancing Button Use Auto Rebalancing check box—The Use Auto Rebalancing check box controls whether manual updates to the Selected Funds portion of the window can be made. When this box is checked, the functionality to clear the Selected Funds window, populate Selected Funds from the list of funds on the left side of the screen, and to populate Selected Funds using Get Funds are not available for use. Unchecking the Use Auto Rebalancing box causes the controls needed to manually fill the Selected Funds box to become available. The Use Auto Rebal check box and button will be available for all counselors. Eventually, these will be available or unavailable based on the counselor's experience level. For PFP counselors, the Use Auto Rebalancing check box will default to checked.

Auto Rebalancing button—The Auto Rebalancing button causes the system to run the auto rebal algorithm to determine how the customer's portfolio should be modified to meet the target portfolio. The results of Auto Rebal will be displayed in the Selected Funds window. The buy/sell amounts specified for the funds may be changed by the counselor. If this button is pressed after changes have been made in the Selected Funds window, these changes are lost. The new results from Auto Rebal will replace, not update, the contents of the Selected Funds window.

If the counselor needs to make more complex changes to the results from Auto Rebal, the Use Auto Rebalancing box may be unchecked and funds may be manually added and/or deleted from the Selected Funds window.

Manual Rebalancing button—The Manual Rebalancing button causes the GUI spread sheet to be displayed.

OK button—The OK button will continue to function as it does currently. When this button is pressed, the Excel Rebalancing spread sheet is displayed and the report can be run.

New GUI Rebal Worksheet

FIG. 6 shows the GUI Rebal Worksheet which allows the counselor to specify buy/sell amounts for the funds held by the customer or added to the portfolio via the Target Allocation window. The display shows the assets by asset class so that the counselor can determine whether the proposed portfolio is meeting the targets. When the counselor presses the OK button, the Target Allocation screen is displayed with the changes made on the GUI Worksheet shown in the Selected Funds window.

Part II

SUMMARY

This portion of the disclosure provides the logic for the auto-rebal project (the automated process for developing investment plans). One of the main purposes of auto-rebal is to eliminate the labor intensive aspects of generating an Investment Planning Analysis (IPA). A summary of how a client's asset allocation is determined is presented first, since this is the framework around auto-rebal and its functionality. That methodology is behind the preferred domain logic (steps) that will provide the foundation for auto-rebal. Auto-rebal may address only repositionable and non-repositionable assets. This should allow PFP to automate 70%+of all IPAs. Alternatively, auto-rebal may address repositionable and non-repositionable assets, as well as "possibly repositionable assets." While the functionality of possibly repositionable assets will not be immediately addressed from a systems standpoint, they will from an implementation standpoint. However, it is critical to the success of auto-rebal that the repositionable functionality be automated and that counselors have the ability on the front end to flush out these issues with clients. Finally, sample language is provided that will be programmed to flow in the report automatically. This will enable the IPA to be fully automated.

All Investment Assets will be one of the following:

1. Non-Repositionable—These assets will never be sold and repositioned to Vanguard funds.

2. Repositionable—These assets will be liquidated and invested in Vanguard funds according to preferred domain rules.

3. Possibly Repositionable—

Are assets needed to reach target SAA?

If no, do not reposition. If yes, reposition based on conditionality.

Possibly repositioned assets will be constrained by client preferences, tax costs and redemption fees. Whether or not these assets will be moved to Vanguard will be determined by the counselor. These possibly repositioned assets will be run as non-repositionable at first. If the target SAA is not met then the counselor will re-run the plan with certain assets as repositionable or because of constraints leave the assets alone.

Determining Asset Allocation

The following steps should be followed when determining a client's strategic asset allocation. This is the first step in the auto-rebal process.

Step 1. Total Assets—determine the client's total investment assets. This is the total amount of assets from the "Show Current."

Step 2. Cash Reserves—subtract out any cash reserves that the client cannot or will not reposition from total assets. These are cash reserves that are included in the report, but are not being repositioned. This does not include emergency reserves that are not included in the analysis.

Note: If the client has a target Portfolio of 1 or 2 as shown in FIG. 6, use the cash reserves that are not repositioned to meet their target cash reserves allocation.

Step 3. Strategic Asset Allocation (SAA)—determine the dollar amount that should be invested in stocks, bonds and cash reserves based upon the client's Ibbotson score.

Step 4. Compare SAAs—compare the target dollar amount of stocks, bonds and cash reserves to the client's proposed allocation. For example, a client has a $1 million portfolio: $800,000 in stocks ($600,000 is non-repositionable), $100,000 in bonds (all repositionable) and $100,000 in cash reserves (all repositionable). The target portfolio is four, 50% stocks and 50% bonds. The proposed portfolio will be $600,000 in stocks and $400,000 in bonds because the client will only reposition $200,000 of stocks.

Note: Any time a client has a current non-repositionable position in an asset or subasset class that exceeds the target, propose the higher non-repositionable amount. Then adjust the other asset or subasset classes accordingly.

Step 5. Determine Stock Suballocation—compute the dollar amount that you will propose for each stock subasset class as follows:

1. Determine the allocation to foreign stocks.

2. Subtract out foreign stocks and individual stocks from the total proposed stock allocation.

3. Multiply 70% times the remaining proposed allocation to stocks after subtracting out foreign and individual stocks to determine allocation to large cap stocks.

4. Multiply 30% times the remaining proposed allocation to stocks after subtracting out foreign and individual stocks to determine allocation to mid/small cap stocks.

Note: If the client has non-repositionable positions in a stock subasset class that exceeds the target, propose the higher non-repositionable amount. Then adjust the other asset or subasset classes accordingly. For example, after subtracting foreign and individual stocks, you have $100,000 to allocate to U.S. stocks. The target would be $70,000 large and $30,000 mid/small. However, the client has $80,000 of non-repositionable large cap stocks, the proposed allocation should be $80,000 large and $20,000 mid/small.

Step 6. Determine Bond Suballocation—compute the dollar amount that you will propose for each bond subasset class as follows:

1. Subtract out individual bonds from the total proposed bond allocation.

2. Multiply the appropriate bond suballocations to the remaining bond allocation after subtracting out individual bonds to determine exposure to short-, intermediate- and long-term bonds.

Note: If the client has non-repositionable positions in a bond subasset class that exceeds the target, propose the higher non-repositionable amount. Then adjust the other asset or subasset classes accordingly. For example, after subtracting individual bonds, you have $1,000,000 to allocate to bond funds. The target is 18% ($360,000) short-, 27% ($540,000) intermediate- and 5% ($100,000) long-term bonds, based on a 50/50 portfolio. However, if the client has $200,000 of non-repositionable long-term bonds, there is only $800,000 to allocate between short- and intermediate-term, rather than the needed $900,000. You would propose $320,000 in short-term bonds ($800,000 times 18%/45%), $480,000 in intermediate-term bonds ($800,000 times 27%/45%) and $200,000 in long-term bonds.

Step 7. Determine Cash Allocation—The client will have a proposed cash allocation if the target portfolio is number 1 or number 2 or if there are non-repositionable cash reserves.

The above logic will provide the client's asset and subasset allocation dollar amounts. Once these dollar amounts are determined we can use the Preferred Domain Rules.

Preferred Domain

Before proceeding to the Preferred Domain Rules, the system will have liquidated all repositionable assets. These proceeds will have been placed in a repositionable money market on a per registration basis. For example, each registration will have a repositionable money market that purchases will be made from.

The only asset and subasset classes that will be considered (for purchases) are those where the target dollar amount is greater than the current dollar amount. If the current asset or subasset dollar amount is greater than the target, the current dollar amount will be used. Determining the proposed amounts will be a function of applying the appropriate ratios based on the target SAA.

When applying preferred domain, taxable investments are always considered first. If the client is in the 39.6% MTB or has an income need, start with the Bonds Outside Hierarchy (based on tax bracket). If the client is in the accumulation stage, or does not have an income need, start with the Stocks Outside Hierarchy. Then, follow the appropriate combination paths that are listed at the end of the hierarchy sets.

I. Stock Outside Hierarchy (If Current Stock Allocation is less than the Target Stock Allocation after all repositionable assets have been liquidated and placed into a money market, continue. If not, proceed to the next step in the determined hierarchy. This logic holds true when determining whether any additional money will be added to an asset or sub-asset class).

A. Large Cap Stocks
 1. Index/Market Exposure*
   a. If client has S&P 500 or alternate Vanguard fund, add to Vanguard S&P 500 fund to the extent that proposed equals target (only add to alternate fund if client does not own "preferred fund" in this registration).
   b. If client does not have any Vanguard index/market exposure, open a new Vanguard S&P 500 fund, and add to it to the extent that proposed equals target.
 2. Growth Exposure
   a. If client has U.S. Growth or alternate Vanguard fund, add to Vanguard U.S. Growth fund to the extent that proposed equals target (only add to alternate fund if client does not own "preferred fund" in this registration).
   b. If client does not have any Vanguard growth exposure, open a new Vanguard U.S. Growth fund, and add to it to the extent that proposed equals target.
 3. Value Exposure
   a. If client has Windsor II or alternate Vanguard fund, add to Vanguard Windsor II fund to the extent that proposed equals target (only add to alternate fund if client does not own "preferred fund" in this registration).
   b. If client does not have any Vanguard value exposure, open a new Vanguard Windsor II fund, and add to it to the extent that proposed equals target.

B. Mid/Small Cap Stocks
 1. Index/Market Exposure*
   a. If client has Extended Market or alternate Vanguard fund, add to Vanguard Extended Market fund to the extent that proposed equals target (only add to alternate fund if client does not own "preferred fund" in this registration).
   b. If client does not have any Vanguard index/market exposure, open a new Vanguard Extended Market fund, and add to it to the extent that proposed equals target.
 2. Active Mid Cap Exposure
   a. If client has Horizon Aggressive Growth or alternate Vanguard fund, add to Vanguard Horizon Aggressive Growth fund to the extent that proposed equals target (only add to alternate fund if client does not own "preferred fund" in this registration).
   b. If client does not have any Vanguard active mid cap exposure, open a new Vanguard Horizon Aggressive Growth fund, and add to it to the extent that proposed equals target.
 3. Active Small Cap Exposure
   a. If client has Explorer or alternate Vanguard fund, add to Vanguard Explorer fund to the extent that proposed equals target (only add to alternate fund if client does not own "preferred fund" in this registration).
   b. If client does not have any Vanguard active small cap exposure, open a new Vanguard Explorer fund, and add to it to the extent that proposed equals target.

* If A1 and B1 provide a 70/30 split, substitute TSMP

C. International Exposure
 1. International Developed**
   a. If client has European Index or Pacific Index or alternate Vanguard fund, add to European Index or Pacific Index funds to the extent that proposed equals target (only add to alternate fund if client does not own "preferred fund" in this registration).
   b. If client does not have any Vanguard international developed exposure, open a new Vanguard European Index or Pacific Index fund, and add to it to the extent that proposed equals target.
 2. International Emerging**
   a. If client has Emerging Markets or alternate Vanguard fund, add to Vanguard Emerging Markets fund to the extent that proposed equals target (only add to alternate fund if client does not own "preferred fund" in this registration).
   b. If client does not have any Vanguard international emerging exposure, open a new Vanguard Emerging Markets fund, and add to it to the extent that proposed equals target.

** If C1 and C2 provide an 80/20 split, or if there is no international exposure, use European Index or Pacific Index II. Stock Inside Hierarchy (If Current Stock Allocation is less than the Target Stock Allocation after all repositionable assets have been liquidated and placed into a money market, continue. If not, proceed to the next step in the determined hierarchy. This logic holds true when determining whether any additional money will be added to an asset or sub-asset class).

A. International Exposure
 1. International Developed***
   a. If client has European Index or Pacific Index or alternate Vanguard fund, add to Vanguard European Index or Pacific Index fund to the extent that proposed equals target (only add to alternate fund if client does not own "preferred fund" in this registration).
   b. If client does not have any Vanguard international developed exposure, open a new Vanguard European Index or Pacific Index fund, and add to it to the extent that proposed equals target.
 2. International Emerging***
   a. If client has Emerging Markets or alternate Vanguard fund, add to Vanguard Emerging Markets fund to the extent that proposed equals target (only add to alternate fund if client does not own "preferred fund" in this registration).
   b. If client does not have any Vanguard international emerging exposure, open a new Vanguard Emerging Markets fund, and add to it to the extent that proposed equals target.

***If A1 and A2 provide an 80/20 split, or if there is no international exposure, use European Index or Pacific Index B. Mid/Small Cap Stocks
 1. Active Small Cap Exposure
   a. If client has Explorer or alternate Vanguard fund, add to Vanguard Explorer fund to the extent that proposed equals target (only add to alternate fund if client does not own "preferred fund" in this registration).
   b. If client does not have any Vanguard active small cap exposure, open a new Vanguard Explorer fund, and add to it to the extent that proposed equals target.

2. Active Mid Cap Exposure
   a. If client has Horizon Aggressive Growth or alternate Vanguard fund, add to Vanguard Horizon Aggressive Growth fund to the extent that proposed equals target (only add to alternate fund if client does not own "preferred fund" in this registration).
   b. If client does not have any Vanguard active mid cap exposure, open a new Vanguard Horizon Aggressive Growth fund, and add to it to the extent that proposed equals target.
3. Index/Market Exposure****
   a. If client has Extended Market or alternate Vanguard fund, add to Vanguard Extended Market fund to the extent that proposed equals target (only add to alternate fund if client does not own "preferred fund" in this registration).
   b. If client does not have any Vanguard index/market exposure, open a new Vanguard Extended Market fund, and add to it to the extent that proposed equals target.

C. Large Cap Stocks
1. Value Exposure
   a. If client has Windsor II or alternate Vanguard fund, add to Vanguard Windsor II fund to the extent that proposed equals target (only add to alternate fund if client does not own "preferred fund" in this registration).
   b. If client does not have any Vanguard value exposure, open a new Vanguard Windsor II fund, and add to it to the extent that proposed equals target.
2. Growth Exposure
   a. If client has U.S. Growth or alternate Vanguard fund, add to Vanguard U.S. Growth fund to the extent that proposed equals target (only add to alternate fund if client does not own "preferred fund" in this registration).
   b. If client does not have any Vanguard growth exposure, open a new Vanguard U.S. Growth fund, and add to it to the extent that proposed equals target.
3. Index/Market Exposure****
   a. If client has S&P 500 or alternate Vanguard fund, add to Vanguard S&P 500 fund to the extent that proposed equals target (only add to alternate fund if client does not own "preferred fund" in this registration).
   b. If client does not have any Vanguard index/market exposure, open a new Vanguard S&P 500 fund, and add to it to the extent that proposed equals target.

**** If B3 and C3 provide a 70/30 split, substitute TSMP

III. Bonds Outside Hierarchy
(If Current Bond Allocation is less than the Target Bond Allocation after all repositionable assets have been liquidated and placed into a money market, continue. If not, proceed to the next step in the determined hierarchy. This logic holds true when determining whether any additional money will be added to an asset or sub-asset class).

A. 31% MTB and Higher
1. Long-Term Municipal Exposure
   a. If client has Insured Long-Term Municipal (or State specific) or alternate Vanguard fund, add to Vanguard Insured Long-Term Municipal Bond fund to the extent that proposed equals target (only add to alternate fund if client does not own "preferred fund" in this registration).
   b. If client does not have any Vanguard long-term municipal bond exposure, open a new Vanguard Insured Long-Term Municipal Bond fund (or State specific), and add to it to the extent that proposed equals target.
2. High-Yield Municipal Exposure
   a. If client has High-Yield Municipal or alternate Vanguard fund, add to Vanguard High-Yield Municipal Bond fund to the extent that proposed equals target (only add to alternate fund if client does not own "preferred fund" in this registration).
   b. If client does not have any Vanguard high-yield municipal bond exposure, open a new Vanguard High-Yield Municipal Bond fund, and add to it to the extent that proposed equals target.
3. Intermediate-Term Municipal Exposure
   a. If client has Intermediate-Term Municipal (or State specific) or alternate Vanguard fund, add to Vanguard Intermediate-Term Municipal Bond fund to the extent that proposed equals target (only add to alternate fund if client does not own "preferred fund" in this registration).
   b. If client does not have any Vanguard intermediate-term municipal bond exposure, open a new Vanguard Intermediate-Term Municipal Bond fund, and add to it to the extent that proposed equals target.
4. Short-Term Municipal Exposure
   a. If client has Limited-Term/Short-Term Municipal (or State specific) or alternate Vanguard fund, add to Vanguard Short-Term Municipal Bond fund to the extent that proposed equals target (only add to alternate find if client does not own "preferred fund" in this registration).
   b. If client does not have any Vanguard short-term municipal bond exposure, open a new Vanguard Limited-Term/Short-Term Municipal Bond fund, and add to it to the extent that proposed equals target.

B. 28% MTB and Higher
1. Long-Term Municipal Exposure
   a. If client has Insured Long-Term Municipal (or State specific) or alternate Vanguard fund, add to Vanguard Insured Long-Term Municipal Bond fund to the extent that proposed equals target (only add to alternate fund if client does not own "preferred fund" in this registration).
   b. If client does not have any Vanguard long-term municipal bond exposure, open a new Vanguard Insured Long-Term Municipal Bond fund (or State specific), and add to it to the extent that proposed equals target.
2. High-Yield Municipal Exposure
   a. If client has High-Yield Municipal or alternate Vanguard fund, add to Vanguard High-Yield Municipal Bond fund to the extent that proposed equals target (only add to alternate fund if client does not own "preferred fund" in this registration).
   b. If client does not have any Vanguard high-yield municipal bond exposure, open a new Vanguard High-Yield Municipal Bond fund, and add to it to the extent that proposed equals target.
3. Intermediate-Term Municipal Exposure
   a. If client has Intermediate-Term Municipal (or State specific) or alternate Vanguard fund, add to Vanguard Intermediate-Term Municipal Bond fund to the extent that proposed equals target (only add to alternate fund if client does not own "preferred fund" in this registration).
   b. If client does not have any Vanguard intermediate-term municipal bond exposure, open a new Vanguard Intermediate-Term Municipal Bond fund, and add to it to the extent that proposed equals target.

4. Short-Term Exposure
a. Active
1. If client has Short-Term Corporate or alternate Vanguard fund, add to Vanguard Short-Term Corporate Bond fund to the extent that proposed equals target (only add to alternate fund if client does not own "preferred fund" in this registration).
2. If client does not have any Vanguard short-term active bond exposure, open a new Vanguard Short-Term Corporate Bond fund, and add to it to the extent that proposed equals target.
b. Passive
1. If client has Short-Term Bond Index or alternate Vanguard fund, add to Vanguard Short-Term Bond Index fund to the extent that proposed equals target (only add to alternate fund if client does not own "preferred fund" in this registration).
2. If client does not have any Vanguard short-term passive bond exposure, open a new Vanguard Short-Term Bond Index fund, and add to it to the extent that proposed equals target.

C. 15% MTB and Higher
1. Long-Term Exposure
a. If client has Long-Term Bond Index or alternate Vanguard fund, add to Vanguard Long-Term Bond Index fund to the extent that proposed equals target (only add to alternate fund if client does not own "preferred fund" in this registration).
b. If client does not have any Vanguard long-term bond exposure, open a new Vanguard Long-Term Bond Index fund, and add to it to the extent that proposed equals target.
2. High-Yield Exposure
a. If client has High-Yield Corporate or alternate Vanguard fund, add to Vanguard High-Yield Corporate Bond fund to the extent that proposed equals target (only add to alternate fund if client does not own "preferred fund" in this registration).
b. If client does not have any Vanguard high-yield bond exposure, open a new Vanguard High-Yield Corporate Bond fund, and add to it to the extent that proposed equals target.
3. Intermediate-Term Exposure
a. Active
1. If client has Intermediate-Term Corporate or alternate Vanguard fund, add to Vanguard Intermediate-Term Corporate Bond fund to the extent that proposed equals target (only add to alternate fund if client does not own "preferred fund" in this registration).
2. If client does not have any Vanguard intermediate-term active bond exposure, open a new Vanguard Intermediate-Term Corporate fund, and add to it to the extent that proposed equals target.
b. Passive
1. If client has Intermediate-Term Bond Index or alternate Vanguard fund, add to Vanguard Intermediate-Term Bond Index fund to the extent that proposed equals target (only add to alternate fund if client does not own "preferred fund" in this registration).
2. If client does not have any Vanguard intermediate-term passive bond exposure, open a new Vanguard Intermediate-Term Bond Index fund, and add to it to the extent that proposed equals target.

4. Short-Term Exposure
a. Active
1. If client has Short-Term Corporate or alternate Vanguard fund, add to Vanguard Short-Term Corporate Bond fund to the extent that proposed equals target (only add to alternate fund if client does not own "preferred fund" in this registration).
2. If client does not have any Vanguard short-term active bond exposure, open a new Vanguard Short-Term Corporate Bond fund, and add to it to the extent that proposed equals target.
b. Passive
1. If client has Short-Term Bond Index or alternate Vanguard fund, add to Vanguard Short-Term Bond Index fund to the extent that proposed equals target (only add to alternate fund if client does not own "preferred fund" in this registration).
2. If client does not have any Vanguard short-term passive bond exposure, open a new Vanguard Short-Term Bond Index fund, and add to it to the extent that proposed equals target.

IV. Bonds Inside Hierarchy
(If Current Bond Allocation is less than the Target Bond Allocation after all repositionable assets have been liquidated and placed into a money market, continue. If not, proceed to the next step in the determined hierarchy. This logic holds true when determining whether any additional money will be added to an asset or sub-asset class).
1. Short-Term Exposure
a. Active
1. If client has Short-Term Corporate or alternate Vanguard fund, add to Vanguard Short-Term Corporate Bond fund to the extent that proposed equals target (only add to alternate fund if client does not own "preferred fund" in this registration).
2. If client does not have any Vanguard short-term active bond exposure, open a new Vanguard Short-Term Corporate Bond fund, and add to it to the extent that proposed equals target.
b. Passive
1. If client has Short-Term Bond Index or alternate Vanguard fund, add to Vanguard Short-Term Bond Index fund to the extent that proposed equals target (only add to alternate fund if client does not own "preferred fund" in this registration).
2. If client does not have any Vanguard short-term passive bond exposure, open a new Vanguard Short-Term Bond Index fund, and add to it to the extent that proposed equals target.
2. Intermediate-Term Exposure
a. Active
1. If client has Intermediate-Term Corporate or alternate Vanguard fund, add to Vanguard Intermediate-Term Corporate Bond fund to the extent that proposed equals target (only add to alternate fund if client does not own "preferred fund" in this registration).
2. If client does not have any Vanguard intermediate-term active bond exposure, open a new Vanguard Intermediate-Term Corporate fund, and add to it to the extent that proposed equals target.
b. Passive
1. If client has Intermediate-Term Bond Index or alternate Vanguard fund, add to Vanguard Intermediate-Term Bond Index fund to the extent that proposed equals target (only add to alternate fund if client does not own "preferred fund" in this registration).
2. If client does not have any Vanguard intermediate-term passive bond exposure, open a new Vanguard Intermediate-Term Bond Index fund, and add to it to the extent that proposed equals target.
3. High-Yield Exposure
a. If client has High-Yield Corporate or alternate Vanguard fund, add to Vanguard High-Yield Corporate Bond fund to the extent that proposed equals target (only add to alternate fund if client does not own "preferred fund" in this registration).
b. If client does not have any Vanguard high-yield bond exposure, open a new Vanguard High-Yield Corporate Bond fund, and add to it to the extent that proposed equals target.
4. Long-Term Exposure
a. If client has Long-Term Bond Index or alternate Vanguard find, add to Vanguard Long-Term Bond Index fund to the extent that proposed equals target (only add to alternate fund if client does not own "preferred fund" in this registration).
b. If client does not have any Vanguard long-term bond exposure, open a new Vanguard Long-Term Bond Index fund, and add to it to the extent that proposed equals target.

Combinations

The following are the various combinations that will be used depending upon the preferred domain rules. When making purchases, on a per registration basis, the registration with the highest dollar amount will be used first.

A. Bonds Outside First (when there is not enough money to fully fund the bond exposure using all taxable dollars)

The following order should be used:

Bonds Outside Hierarchy (based on tax bracket)

Bonds Inside Hierarchy

Stocks Inside Hierarchy

B. Bonds Outside First (when there is enough money to fully fund the bond exposure using all taxable dollars)

The following order should be used:

Bonds Outside Hierarchy (based on tax bracket)

Stocks Outside Hierarchy

Stocks Inside Hierarchy

C. Stocks Outside First (when there is not enough money to fully fund the stock exposure using all taxable dollars)

The following order should be used:

Stocks Outside Hierarchy

Stocks Inside Hierarchy

Bonds Inside Hierarchy

D. Stocks Outside First (when there is enough money to fully fund the stock exposure using all taxable dollars)

The following order should be used:

Stocks Outside Hierarchy

Bonds Outside Hierarchy (based on tax bracket)

Bonds Inside Hierarchy

Text

Before each set of steps, a heading that reads "Exchanges Within Your Joint Accounts" (or that registration title) is inserted. Each Registration ultimately has up to four steps. However, if any of the above steps are not used, the step numbers adjust to be sequential.

Each step has its own Tax Impact followed by its own Transaction Fees. Since Vanguard and non-Vanguard redemptions, and Vanguard purchases, each have their own step, combining tax and fee notes is not a concern.

Vanguard Assets

Step 1—Exchange $25,000 from your joint Vanguard Windsor II Fund and $25,000, or all remaining shares, from your Vanguard U.S. Growth Fund to a new or your existing Vanguard Money Market Prime Portfolio.

Step 2—Exchange $50,000, or all shares, from your Vanguard Money Market Prime Portfolio to the following Vanguard Funds:

(1) $amount to fund (2) $ amount to find (add "or all remaining shares" to text in last purchase, if a full redemption)

Non-Vanguard Repositionable Assets

Step 1—Liquidate the following assets: list funds to be sold and dollar value, where appropriate add "or all shares". Invest the proceeds in a new or your existing Vanguard Money Market Prime Portfolio.

Step 2—Exchange $50,000, or all shares, from your Vanguard Money Market Prime Portfolio to the following Vanguard Funds:

(1) $ amount to fund (2) $ amount to fund (add "or all remaining shares" to text in last purchase, if a full redemption)

Non-Vanguard "Possibly" Repositionable Assets

This language will be used by counselors when "possibly" repositionable assets are sold. When the "possibly" repositionable functionality is added to auto-rebal, this text will be inserted automatically.

Step 1—In order to reach your target asset allocation, liquidate the following assets: list funds to be sold and dollar value, where appropriate add "or all shares". Invest the proceeds in a new or your existing Vanguard Money Market Prime Portfolio.

Step 2—Exchange $50,000, or all shares, from your Vanguard Money Market Prime Portfolio to the following Vanguard Funds:

(1) $ amount to fund (2) $ amount to fund (add "or all remaining shares" to text in last purchase, if a full redemption)

Note: On a per registration basis, all sales will be made first. The following hierarchy will be used for each registration:

Step 1. Exchanges of Vanguard funds.

Step 2. Exchanges of repositionable non-Vanguard funds.

Step 3. Exchanges of "possibly" repositionable non-Vanguard funds.*

Step 4. Purchases of Vanguard funds.

*Step 3 is separated out by the counselor if possibly repositionable are not addressed.

Tax Cost

Tax Cost information will flow into the report based on the data entered into the system by the counselor. If the fund is a money market, the tax cost will be none. If redeeming a money market is part of several redemptions, that fund will not be part of the tax cost table. For funds where tax cost is not provided (non-Vanguard funds) or is unavailable (Vanguard funds) the counselor will enter a zero under cost basis in the system. If one of these funds is sold, the average cost not available language will flow in for Vanguard and/or non-Vanguard funds.

Vanguard Tax Cost Available:

Tax Impact: The following is a summary of the potential tax consequences associated with the above recommendation. We use the average cost (single category) method to compute gains and losses on liquidations. Your actual gain or loss may vary.

Fund$^1$ Redemption Cost Basis$^2$ Redemption Proceeds$^3$ Gain/Loss$^4$

1=Fund sold.

2=Shares sold multiplied by average cost per share. If total redemption, it equals total cost.

3=Shares sold multiplied by current price per share. If total redemption, it equals total value.

4=Redemption Proceeds minus Redemption Cost Basis. Negative numbers have brackets, i.e. ($200)

Non-Vanguard Tax Cost Available:

Tax Impact: The following is a summary of the potential tax consequences associated with the above recommendation. The potential gains or losses are based on the information that you provided.

Fund$^1$ Redemption Cost Basis$^2$ Redemption Proceeds$^3$ Gain/Loss$^4$

1=Fund sold.

2=Shares sold multiplied by average cost per share. If total redemption, it equals total cost.

3=Shares sold multiplied by current price per share. If total redemption, it equals total value.

4=Redemption Proceeds minus Redemption Cost Basis. Negative numbers have brackets, i.e., ($200)

Vanguard Tax Cost not Available:

Tax Impact: Average cost information on the above account(s) is pending and will be discussed prior to implementation.

Non-Vanguard Tax Cost not Available:

Tax Impact: The above recommendation was made without regard to cost basis. Please consider the tax ramifications of this transaction before implementing the above recommendation.

Some Vanguard Tax Cost Available:

Tax Impact: Average cost information on the following accounts is pending: list funds with "zero" cost basis, and will be discussed prior to implementation. The following is a summary of the potential tax consequences associated with selling the remaining funds. We use the average cost (single category) method to compute gains and losses on liquidations. Your actual gain/loss may vary.

Fund$^1$ Redemption Cost Basis$^2$ Redemption Proceeds$^3$ Gain/Loss$^4$

1=Fund sold.

2=Shares sold multiplied by average cost per share. If total redemption, it equals total cost.

3=Shares sold multiplied by current price per share. If total redemption, it equals total value.

4=Redemption Proceeds minus Redemption Cost Basis. Negative numbers have brackets, i.e. ($200)

Some Non-Vanguard Tax Cost Available:

Tax Impact: The above recommendation considered cost basis where provided. The following represents your potential gains or losses for funds where cost basis was provided.

Transaction Fees

Vanguard Transaction Fees:

Transaction Fees (New Funds): Please refer to "Your Fund Recommendations" section and prospectus for any applicable transaction fees associated with investing in . . . (the funds with possible or definite purchase or redemption fees will be listed based on the buy/sell recommendations).

Transaction Fees (Existing Funds): Please refer to your fund prospectus for any applicable transaction fees associated with investing in . . . (the funds with possible or definite purchase or redemption fees will be listed based on the buy/sell recommendations).

OR

Transaction Fees: None.

Non-Vanguard Transaction Fees:

Transaction Fees: Please consult with the above providers for any fees associated with this transaction.

Dollar-Cost Averaging

The dollar amount to dollar-cost average will equal the proposed stock amount minus the current stock amount. We will only recommend dollar-cost-averaging when the proposed stock percentage increases by 10% or more over the current stock percentage. That dollar amount will be dollar-cost averaged over one year. The language is as follows: ($⅕$^{th}$ amount initially, and $⅕$^{th}$ amount every three months over the course of a year, for a total of five exchanges). The second ⅕$^{th}$ amount will be rounded to the nearest $100 and the first adjusted accordingly. The system will dollar-cost average into stock funds until it reaches the total needed, adding the above text next to each fund it DCA's into.

Vanguard Fund Choices (Core Portfolio)

I. Stocks
  A. Large U.S. Stocks
    1. Market/Index
      a. Preferred—500 Portfolio
      b. Alternate—Quantitative, Trustees' Equity and Tax-Managed Growth & Income 2. Growth
   a. Preferred—U.S. Growth
   b. Alternate—Morgan Growth and Index Growth
3. Value
   a. Preferred—Windsor II
   b. Alternate—Windsor, Equity Income and Index Value
B. U.S. Total Stock Market (to be used when large market/index to mid/small market/index equals 70/30)
   1. Preferred—Total Stock Market
   2. Alternate—Tax-Managed Capital Appreciation
C. Mid/Small U.S. Stocks
   1. Market/Index
      a. Preferred—Extended Market
      b. Alternate—Index Small Cap
   2. Mid Cap Active
      a. Preferred—Horizon—Aggressive Growth
      b. Alternate—Primecap, Selected Value, Horizon—Capital Opportunity and REIT Index
   3. Small Cap Active
      a. Preferred—Explorer
      b. Alternate—None
D. International Stocks
   1. Developed
      a. Preferred—European (50%) and Pacific (50%)
      b. Alternate—International Growth and Trustees' International
   2. Emerging
      a. Preferred—Emerging Markets Index
      b. Alternate—None
   3. European Index or Pacific Index (to be used when there is an 80/20 ratio between developed and emerging)
      a. Preferred—European Index or Pacific Index
      b. Alternate—None II. Bonds
   A. High Yield
      1. Municipal
         a. Preferred—High Yield Muni
         b. Alternate—None
      2. Corporate
         a. Preferred—High Yield Corporate
         b. Alternate—None
   B. Long-Term
      1. Municipal
         a. Preferred—Insured Long-Term Muni or State specific Muni
         b. Alternate—Long-Term Muni
      2. Taxable
         a. Preferred—Long-Term Bond Index
         b. Alternate—Long-Term Corporate, Admiral Long-Term U.S. Treasury and Long-Term U.S. Treasury
   C. Intermediate-Term
      1. Municipal
         a. Preferred—Intermediate-Term Muni or State specific Muni
         b. Alternate—None
      2. Active
         a. Preferred—Intermediate-Term Corporate
         b. Alternate—Admiral Intermediate-Term U.S. Treasury, Intermediate-Term U.S. Treasury
      3. Passive
         a. Preferred—Intermediate-Term Bond Index
         b. Alternate—Total Bond Market Index
   D. Short-Term
      1. Municipal
         a. Preferred—Short-Term Muni (Portfolio 1) and Limited-Term and Muni (Portfolio 2–7)
         b. Alternate—Limited-Term Muni (Portfolio 1) and Short-Term Muni (Portfolio 2–7)
      2. Active
         a. Preferred—Short-Term Corporate
         b. Alternate—Short-Term Admiral U.S. Treasury, Short-Term U.S. Treasury
      3. Passive
         a. Preferred—Short-Term Bond Index
         b. Alternate—None Vanguard Fund Choices (Tax-Efficient Portfolio)
I. Stocks
   A. U.S. Total Stock Market (to be used when large market/index to mid/small market/index equals 70/30)
      1. Preferred—Total Stock Market (50%) and Tax-Managed Capital Appreciation (50%)
      2. Alternate—None
   B. Large U.S. Stocks
      1. Market/Index
         a. Preferred—None, only use alternate when Total Stock Market and Capital Appreciation cannot be used
         b. Alternate—Tax-Managed Growth & Income (50%) and 500 Portfolio (50%)
   C. Mid/Small U.S. Stocks
      1. Market/Index
         a. Preferred—None, only use alternate when Total Stock Market and Capital Appreciation cannot be used
         b. Alternate—Extended Market (50%) and Small Cap (50%)
   D. International Stocks
      1. Developed
         a. Preferred—Pacific (50%) and Europe (50%)
         b. Alternate—None
      2. Emerging
         a. Preferred—Emerging Markets Index
         b. Alternate—None
      3. European Index or Pacific Index (to be used when there is an 80/20 ratio between developed and emerging)
         a. Preferred—European Index or Pacific Index
         b. Alternate—None II. Bonds
   A. High Yield
      1. Municipal
         a. Preferred—High Yield Muni
         b. Alternate—None
      2. Corporate
         a. Preferred—High Yield Corporate
         b. Alternate—None
   B. Long-Term
      1. Municipal
         a. Preferred—Insured Long-Term Muni or State specific Muni
         b. Alternate—Long-Term Muni
      2. Taxable
         a. Preferred—Long-Term Bond Index
         b. Alternate—Long-Term Corporate, Admiral Long-Term U.S. Treasury and Long-Term U.S. Treasury C. Intermediate-Term
 1. Municipal
  a. Preferred—Intermediate-Term Muni or State specific Muni
  b. Alternate—None
 2. Active
  a. Preferred—Intermediate-Term Corporate
  b. Alternate—Admiral Intermediate-Term U.S. Treasury, Intermediate-Term U.S. Treasury
 3. Passive
  a. Preferred—Intermediate-Term Bond Index
  b. Alternate—Total Bond Market Index
D. Short-Term
 1. Municipal
  a. Preferred—Short-Term Muni (Portfolio 1) and Limited-Term and Muni (Portfolio 2–7)
  b. Alternate—Limited-Term Muni (Portfolio 1) and Short-Term Muni (Portfolio 2–7)
 2. Active
  a. Preferred—Short-Term Corporate
  b. Alternate—Short-Term Admiral U.S. Treasury, Short-Term U.S. Treasury
 3. Passive
  a. Preferred—Short-Term Bond Index
  b. Alternate—None Vanguard Fund Choices (Income Portfolio)

I. Stocks
 A. Large U.S. Stocks
  1. Market/Index
   a. Preferred—500 Portfolio
   b. Alternate—Quantitative, Trustees' Equity and Tax-Managed Growth & Income
  2. Growth
   a. Preferred—None
   b. Alternate—None
  3. Value
   a. Preferred—Windsor II (50%) and Equity Income (50%)
   b. Alternate—Windsor and Index Value
 B. U.S. Total Stock Market (to be used when large market/index to mid/small market/index equals 70/30)
  1. Preferred—Total Stock Market
  2. Alternate—Tax-Managed Capital Appreciation
 C. Mid/Small U.S. Stocks
  1. Market/Index
   a. Preferred—Extended Market
   b. Alternate—Index Small Cap
  2. Mid/Small Active
   a. Preferred—REIT Index
   b. Alternate—Primecap, Selected Value, Horizon—Capital Opportunity and Explorer
 D. International Stocks
  1. Developed
   a. Preferred—European (50%) and Pacific (50%)
   b. Alternate—International Growth and Trustees' International
  2. Emerging
   a. Preferred—Emerging Markets Index
   b. Alternate—None
  3. European Index or Pacific Index (to be used when there is an 80/20 ratio between developed and emerging)
   a. Preferred—European Index or Pacific Index
   b. Alternate—None II. Bonds
 A. High Yield
  1. Municipal
   a. Preferred—High Yield Muni
   b. Alternate—None
  2. Corporate
   a. Preferred—High Yield Corporate
   b. Alternate—None
 B. Long-Term
  1. Municipal
   a. Preferred—None
   b. Alternate—None
  2. Taxable
   a. Preferred—Long-Term Corporate
   b. Alternate—None
 C. Intermediate-Term
  1. Municipal
   a. Preferred—Intermediate-Term Muni or State specific Muni
   b. Alternate—None
  2. Active
   a. Preferred—Intermediate-Term Corporate
   b. Alternate—None
  3. Passive
   a. Preferred—None
   b. Alternate—None
 D. Short-Term
  1. Municipal
   a. Preferred—Short-Term Muni and Limited-Term and Muni (Portfolio 1 and 2)
   b. Alternate—None
  2. Active
   a. Preferred—Short-Term Corporate
   b. Alternate—None
  3. Passive
   a. Preferred—None
   b. Alternate—None Vanguard Fund Choices (Annuity)

I. Stocks
 A. Large U.S. Stocks
  1. Market/Index
   a. Preferred—Equity Index
   b. Alternate—None
  2. Growth
   a. Preferred—Growth Portfolio
   b. Alternate—None
  3. Value
   a. Preferred—Equity Income
   b. Alternate—None
 B. Mid/Small U.S. Stocks
  1. Small Cap Active
   a. Preferred—Small Company Growth
   b. Alternate—None
 D. International Stocks
  1. Developed
   a. Preferred—International
   b. Alternate—None II. Bonds
 A. High Yield
  1. Corporate
   a. Preferred—High Yield Bond
   b. Alternate—None
 B. Intermediate-Term
  1. Passive
   a. Preferred—High Grade Bond Index
   b. Alternate—None Selling Possibly Repositionable Assets Once we have the functionality to add "possibly repositionable" assets to the system program, we will need a decision-making hierarchy to determine when, if at all, assets will be sold. There are two factors that will influence this decision: how close the client's strategic asset allocation (SAA) is to the target, without any further sales, and the tax cost associated with selling additional assets.

Step 1: Compare SAAs

If the client's SAA is within three percentage points (+/−3%) of the target, after selling all "repositionable" assets, do not consider selling any "possibly repositionable" assets. If the client's SAA is not within three percentage points (+/−3%) of the target, after selling all "repositionable assets", consider the tax cost of selling any "possibly repositionable" assets.

Rationale: Having a portfolio that is within 3 percent of the target should give a client a proposed portfolio with similar risk/return characteristics to the target portfolio. A portfolio 3% or less off target will behave similarly to the ideal target, but would have to be re-balanced in the future.

Step 2: Consider the tax cost

In order to get the client's SAA within three percentage points of the target, sell "possibly repositionable" assets until the tax cost equals five percent of the value of the portfolio. (The tax cost equals the market value minus the cost basis times 20% or 10%.) Liquidations will be made until the earlier of: (1) the proposed SAA is within three percent of the target or (2) the tax cost (including the cost of previous moves) equals five percent of the portfolio. Assets with the least tax cost will be sold first.

Note: It is possible that selling "repositionable" assets will result in a tax cost greater than five percent. If this is the case, no "possibly repositionable" assets will be sold. Rationale (five percent rule): If the overall tax cost from the sale of securities is no greater than 5% of the portfolio (in aggregate), sales are made until the tax obligation equals 5% of the overall portfolio. Priority of sale is based on (a) tax consequence, lowest to highest (within each over-weighed asset or sub-asset class. The five percent threshold came from the fact that, in most of our allocations, the client would still have appositive real after-tax return, or the client's real wealth would not decline in most cases. Rationale (20% and 10% tax rate): Using a 20% tax rate (or 10% for taxpayers in the 15% MTB) will be an accurate way to estimate a client's tax liability. It will understate their tax cost when they have a short-term holding period and their MTB is greater than 15%. (The likelihood of this is mitigated by the fact that assets greatly appreciating over a period less than twelve months, in many cases, will be non-repositionable.)

System Output Example Showing Summary of Conclusions

See the section entitled "AUTO REBAL SUMMARY" in Part I. above.

CONCLUSION

Part II provides the foundation for auto-rebal. By first having the repositionable and non-repositionable functionality, at least 70% of the investment planning analyses can be automated. Further development will allow the auto-rebal product to handle a larger percentage of clients. The following are recommended developmental steps for auto-rebal:

Stage 1: Develop the foundation for auto-rebal by creating the repositionable functionality in conjunction with the preferred domain logic and automated text.

Stage 2: Add possibly repositionable functionality that is based on a tax and fee cost analysis.

Stage 3: Give the system (or counselor) the flexibility to choose an income tilt or tax-efficient portfolio.

Stage 4: Allow the counselor to pick the hierarchy of constraints (prioritize them) in the GUI.

Part III

Figures 1, 8A:
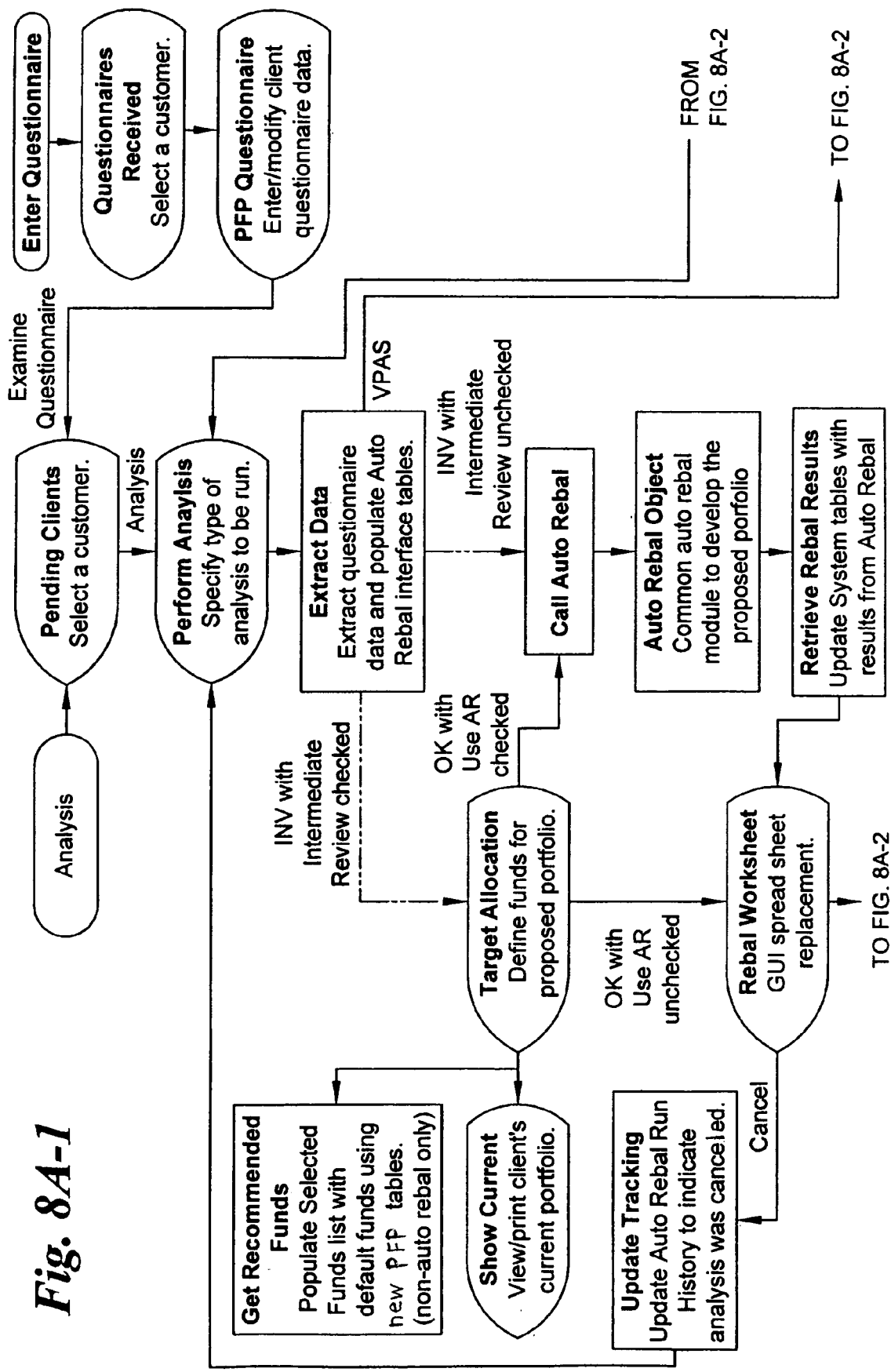
FIG. 8A-1 through FIG. 8H, taken together, provide a detailed, functional data flowchart of the present invention.
Figures 2, 8A:
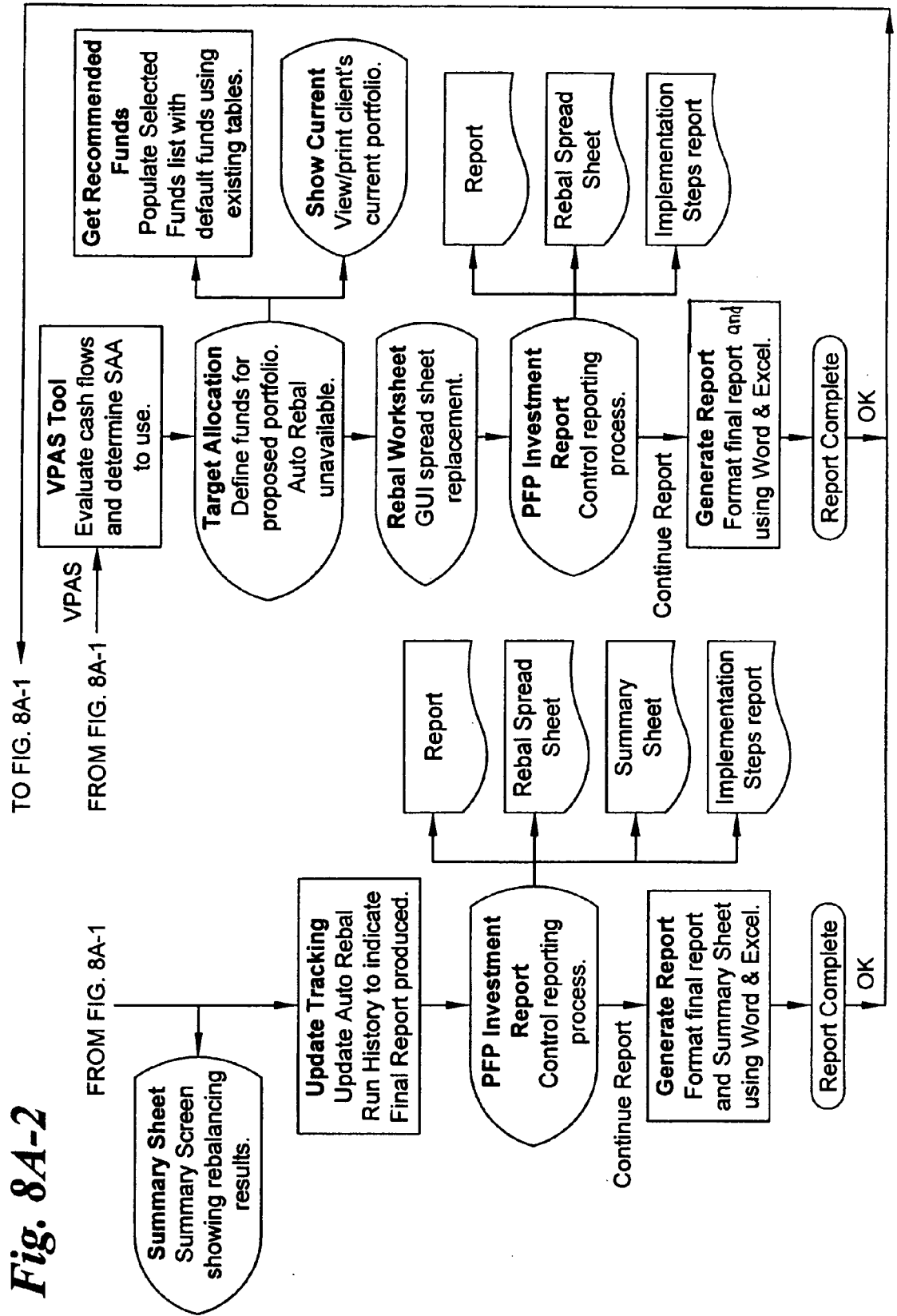
Figure 8B:
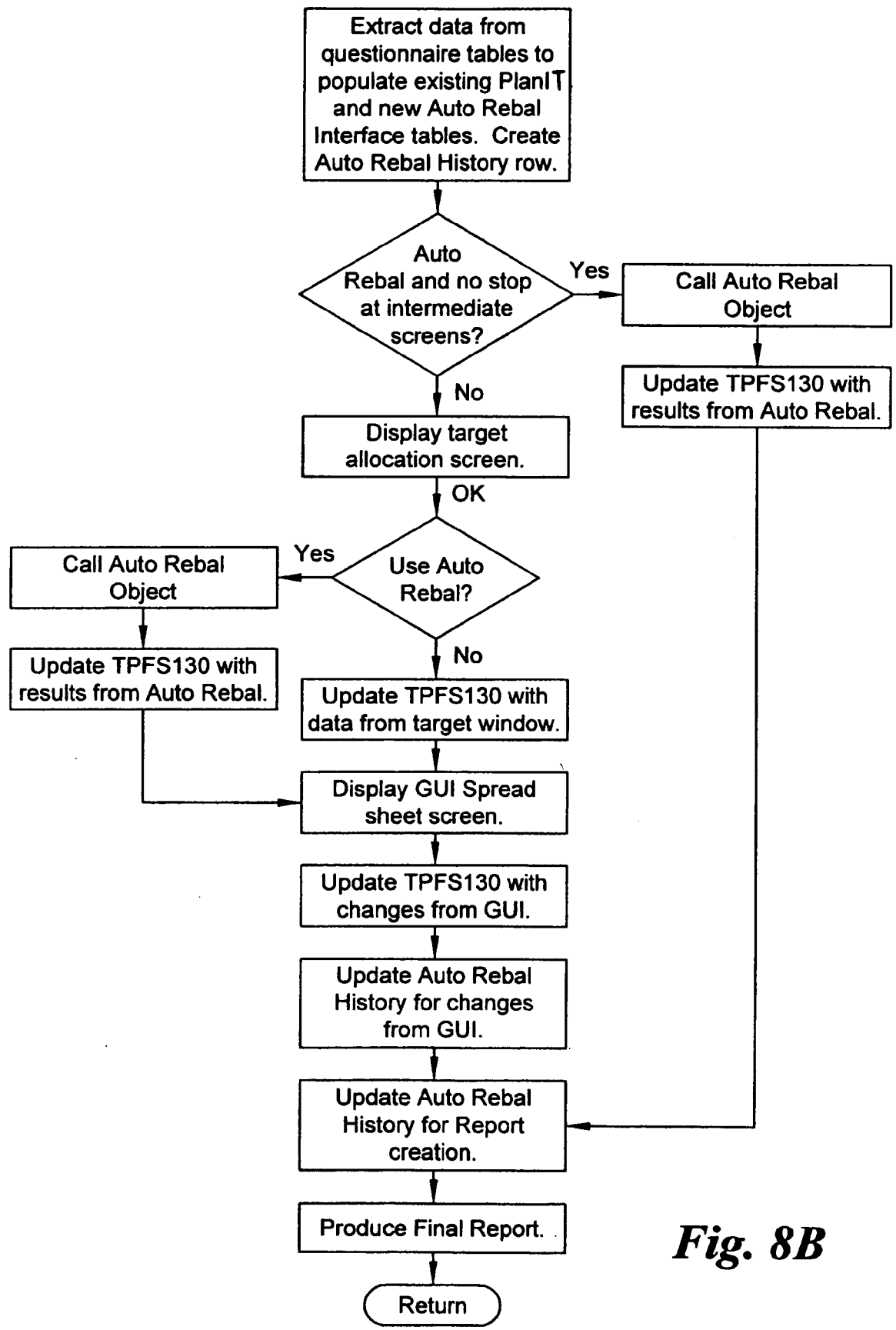
Figure 8C:
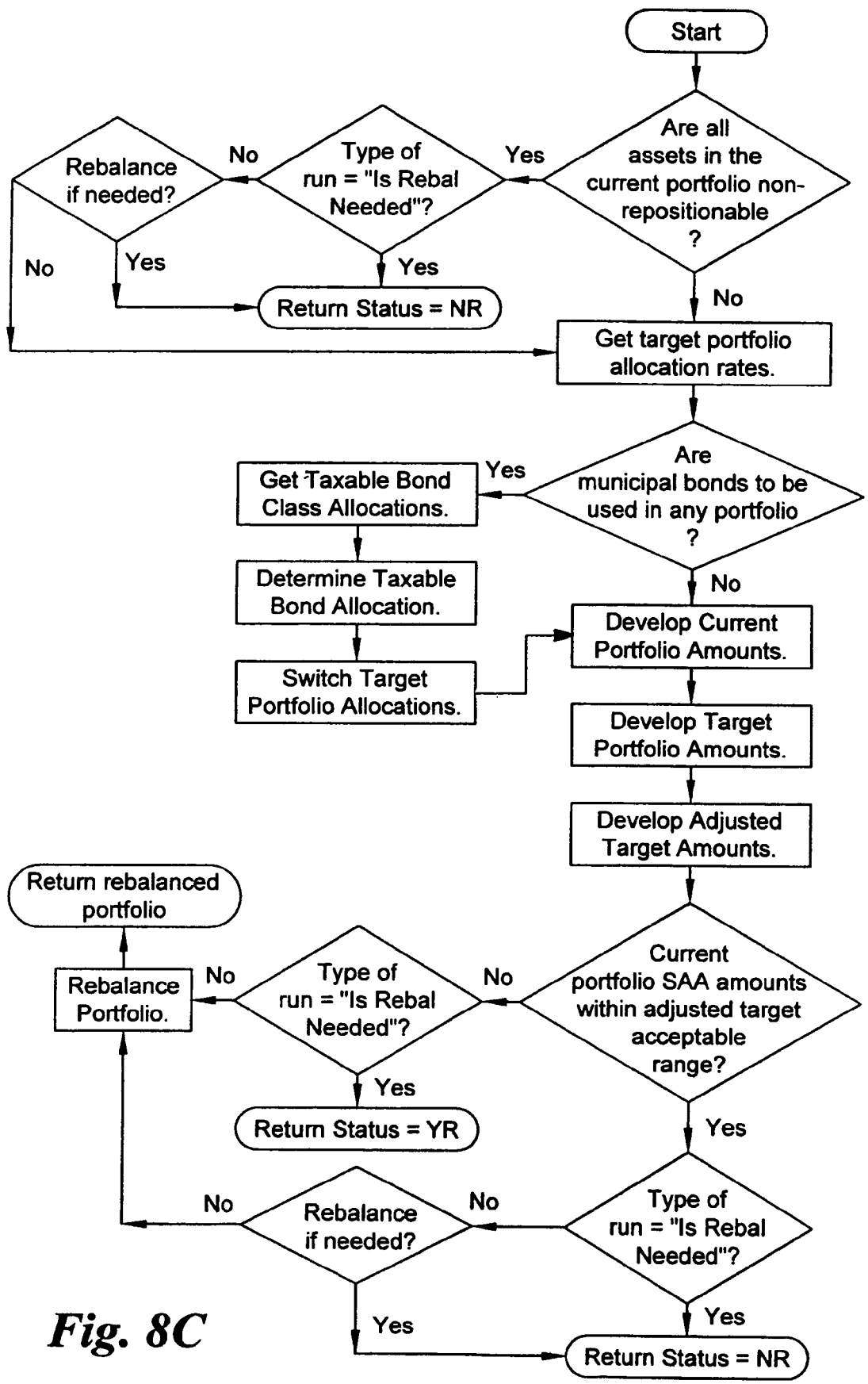
Figure 8D:
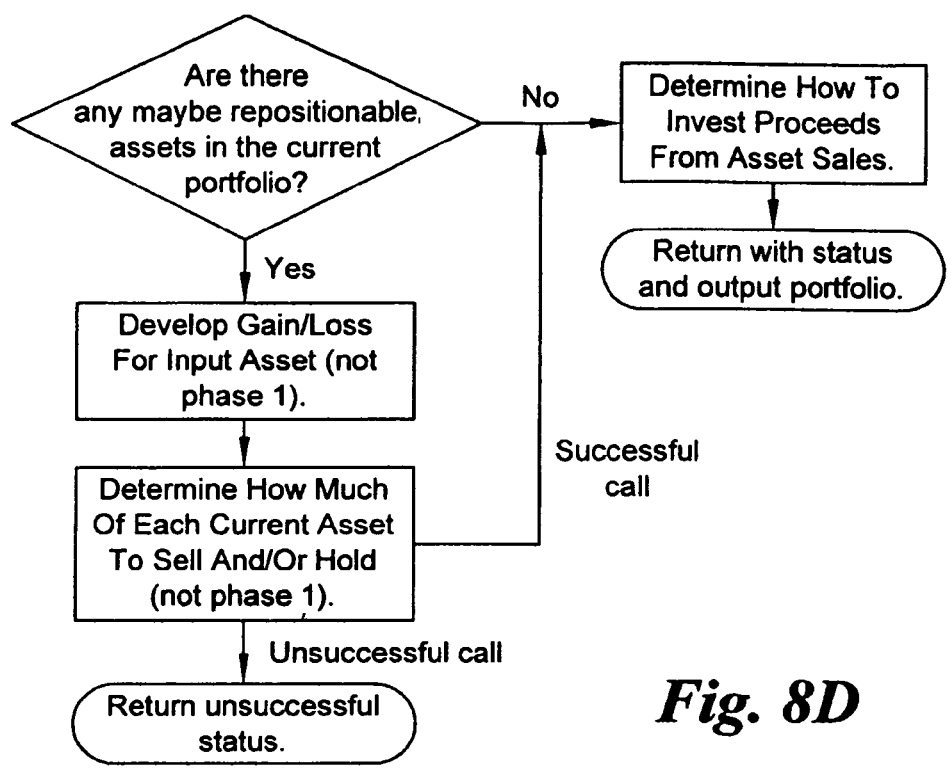
Figure 8E:
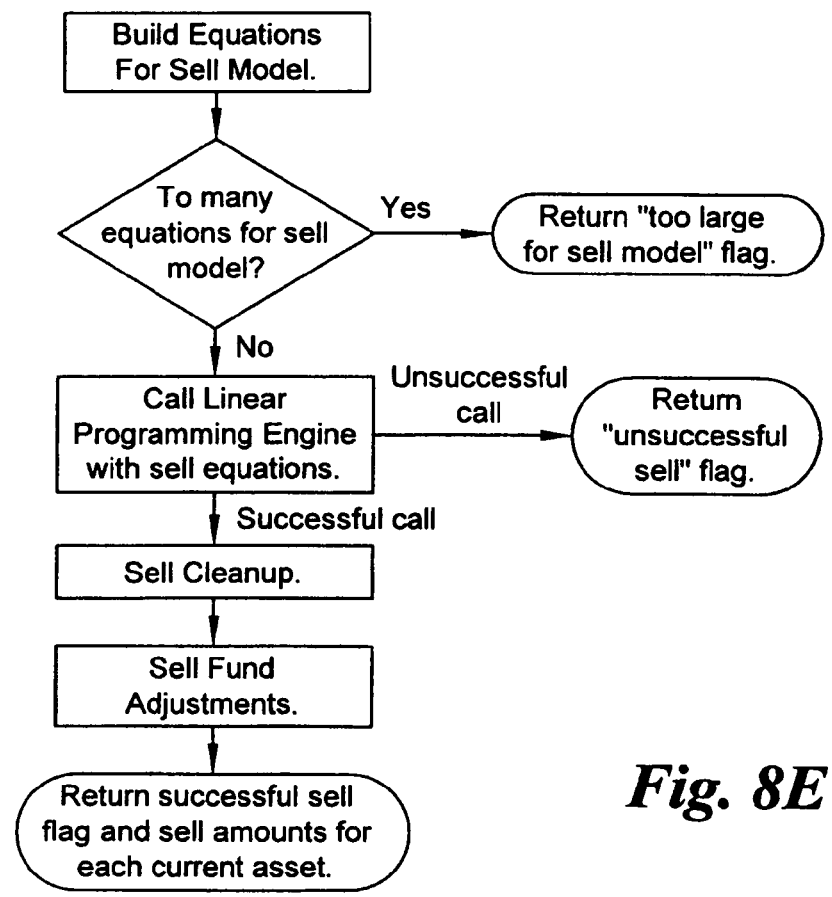
Figure 8F:
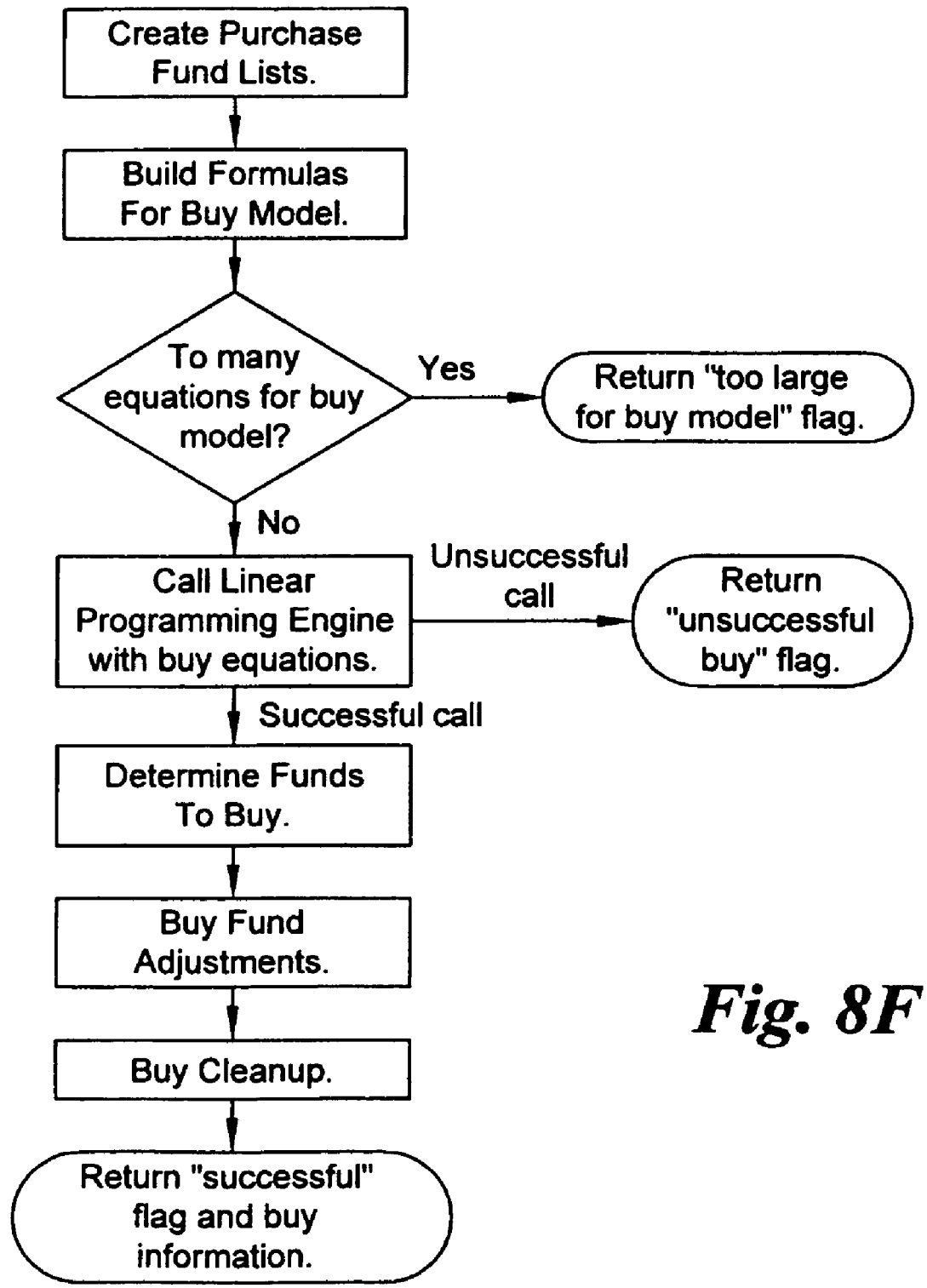
Figure 8G:
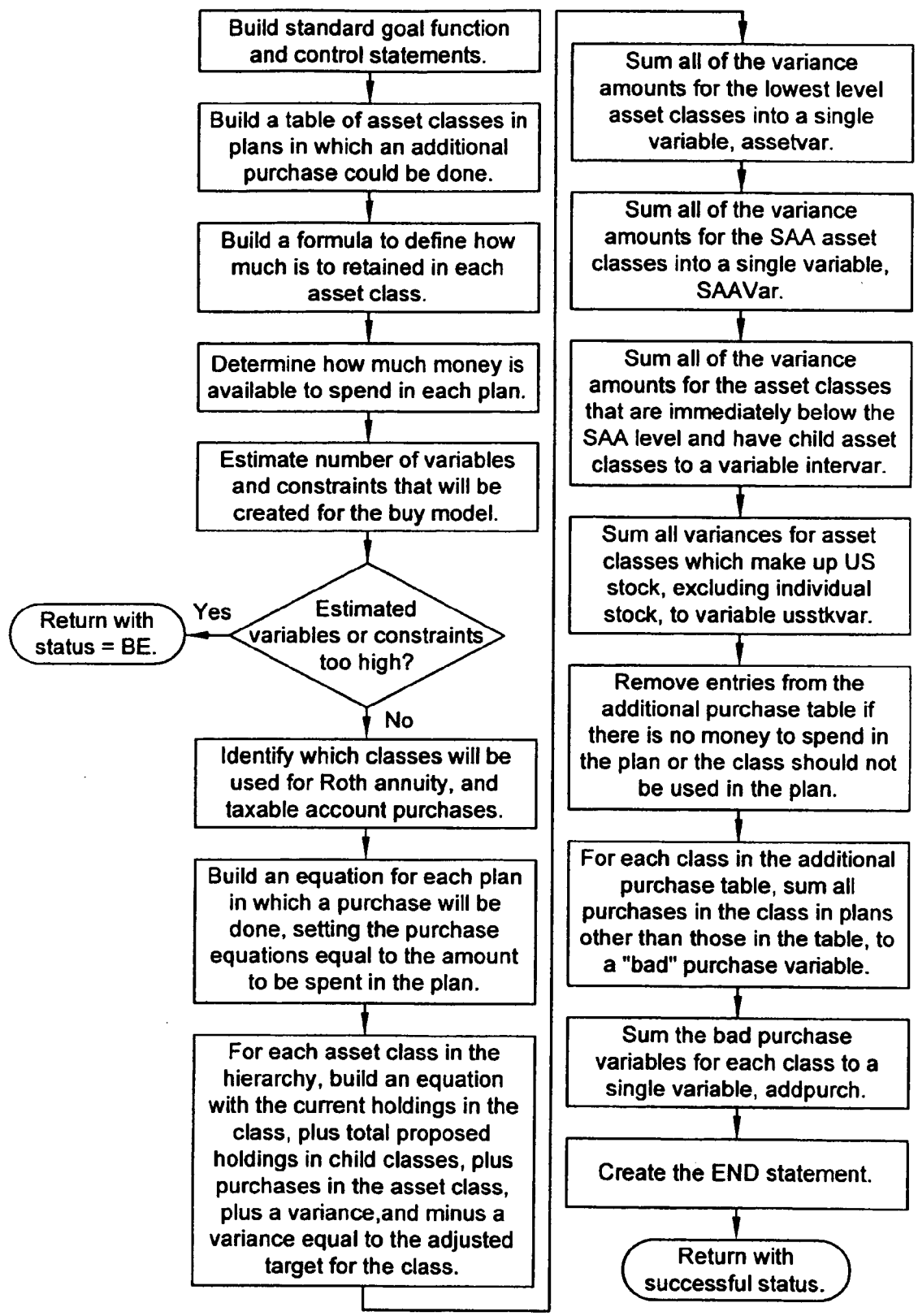
Figure 8H:
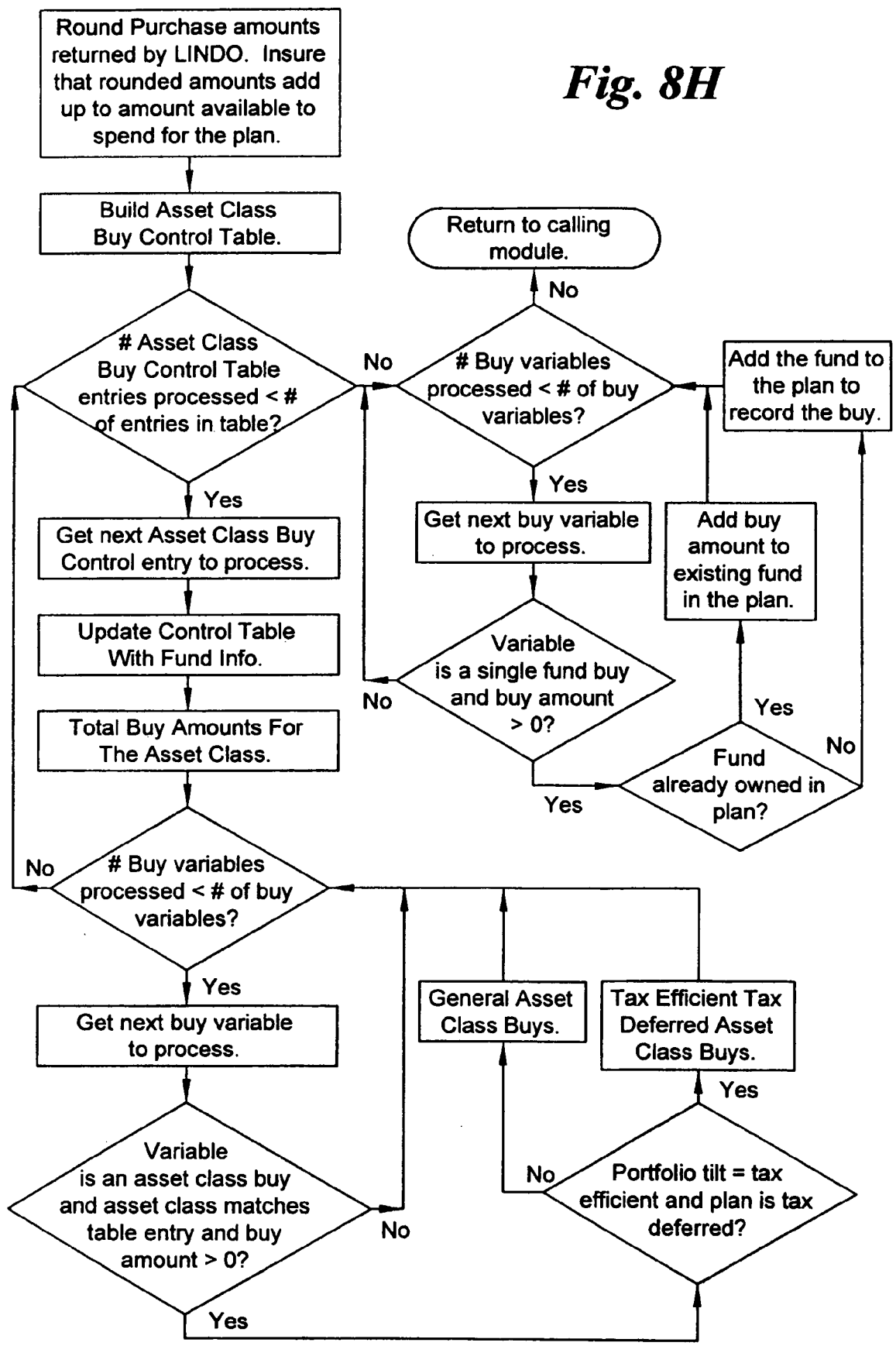
Figure 9A:
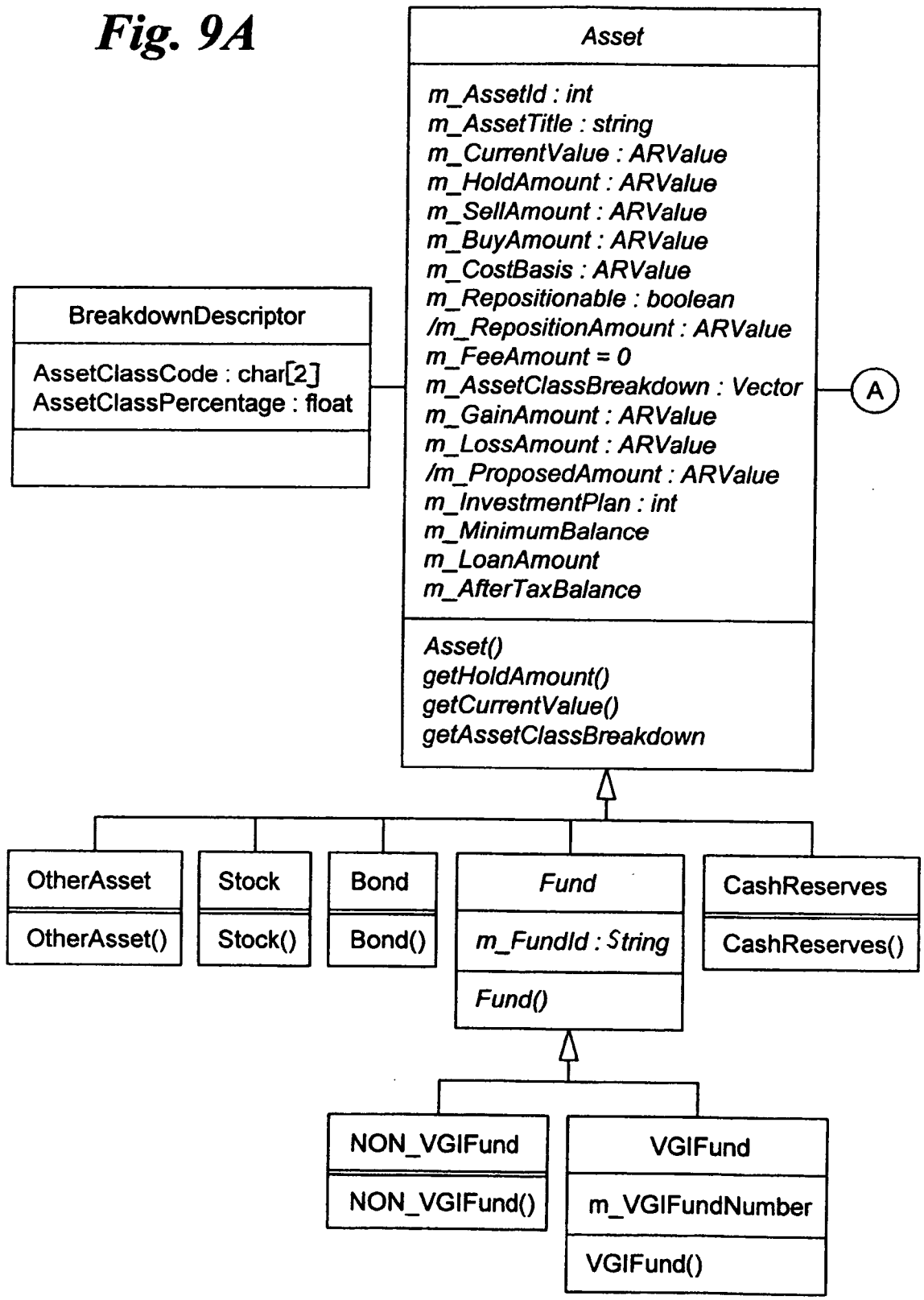
Figure 9B:
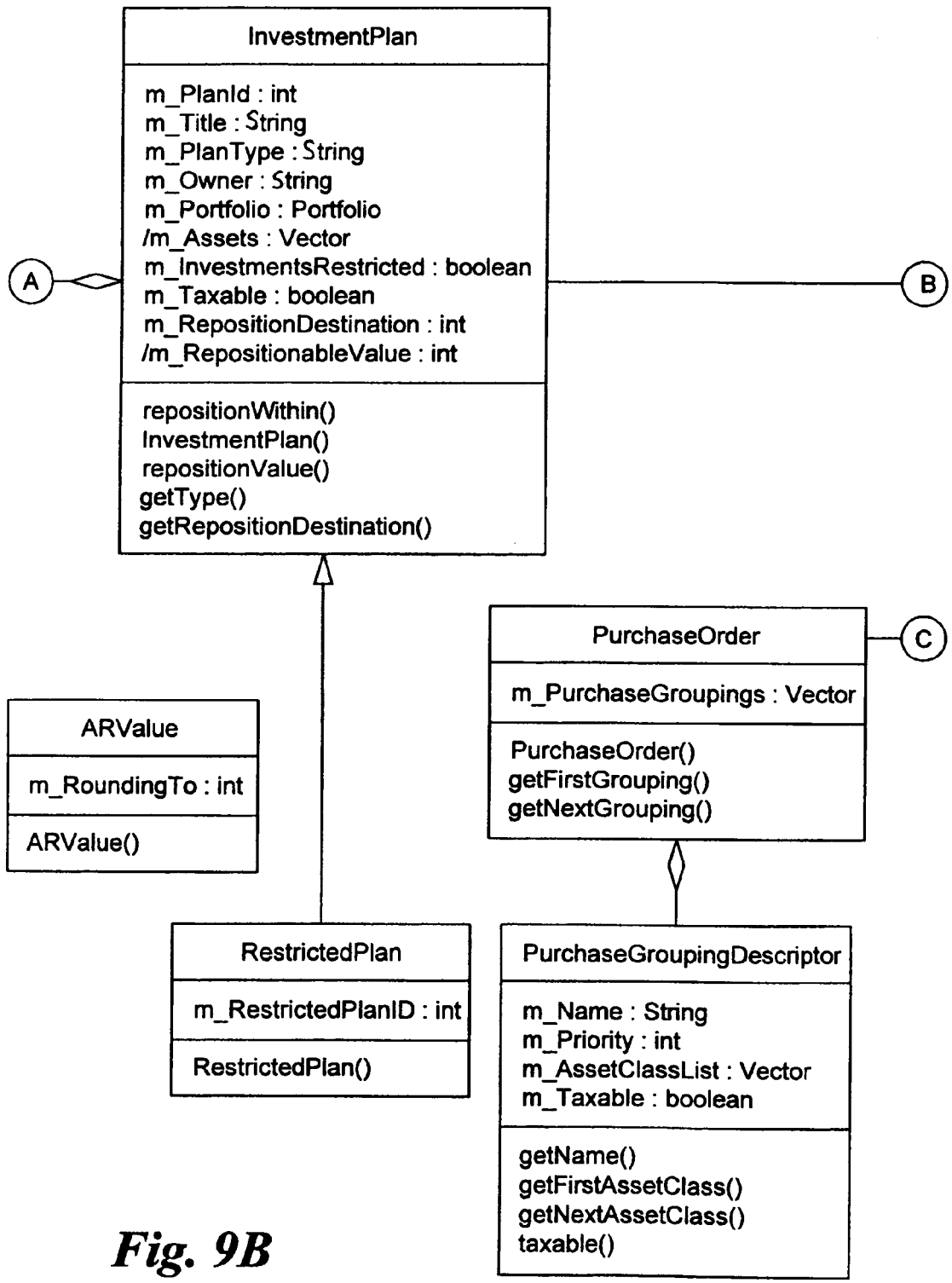
Figure 9C:
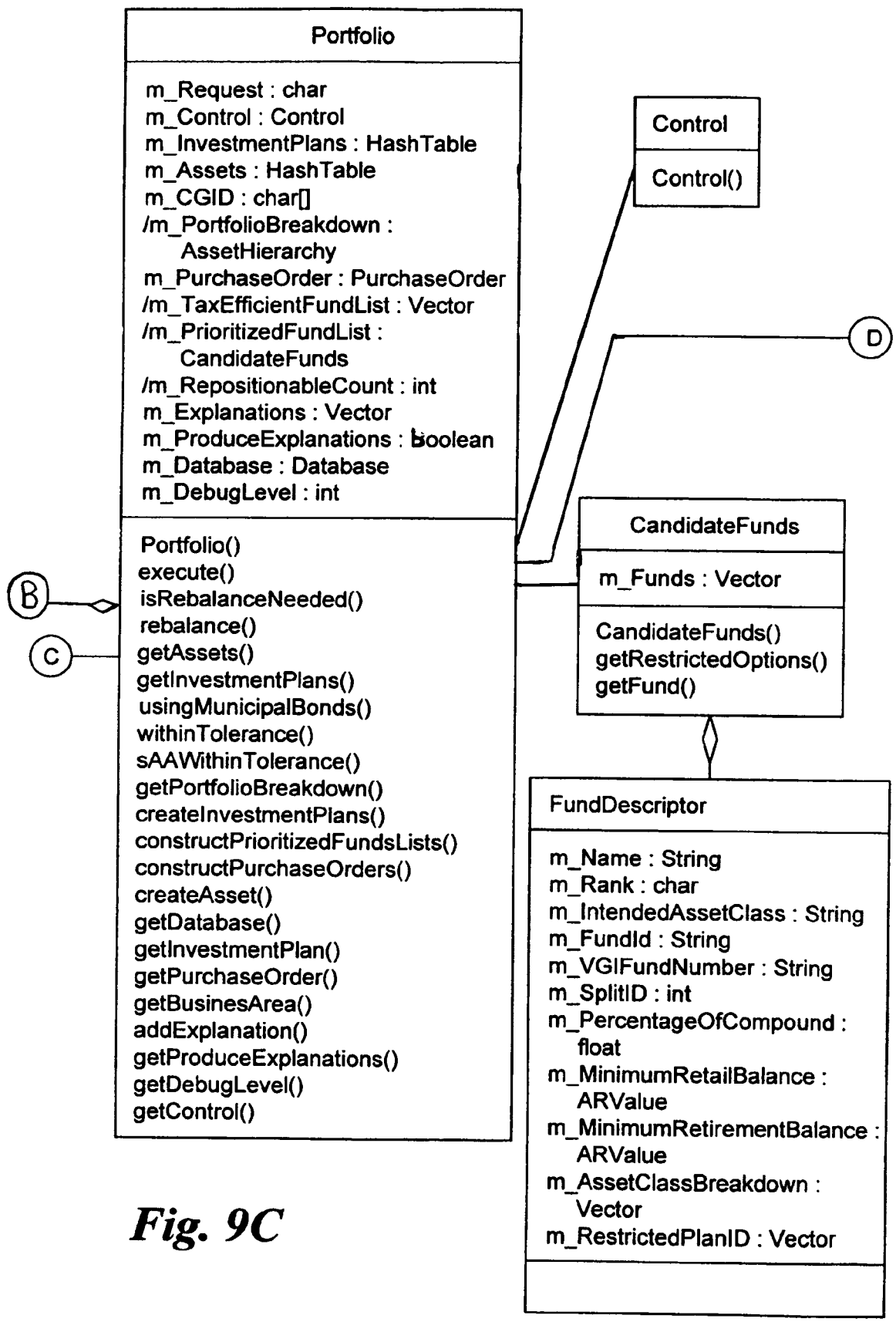
Figure 9D:
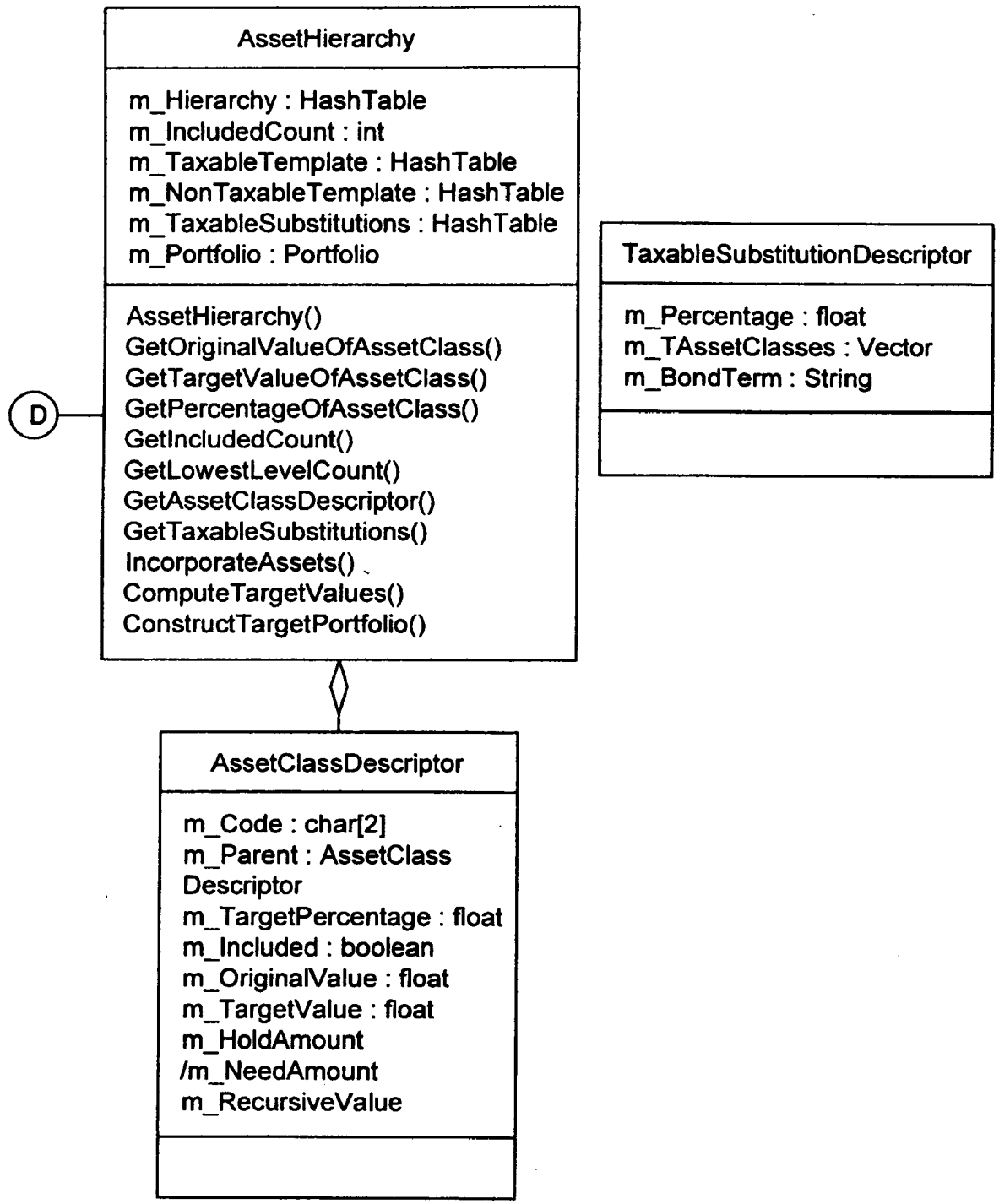
Figure 9G:
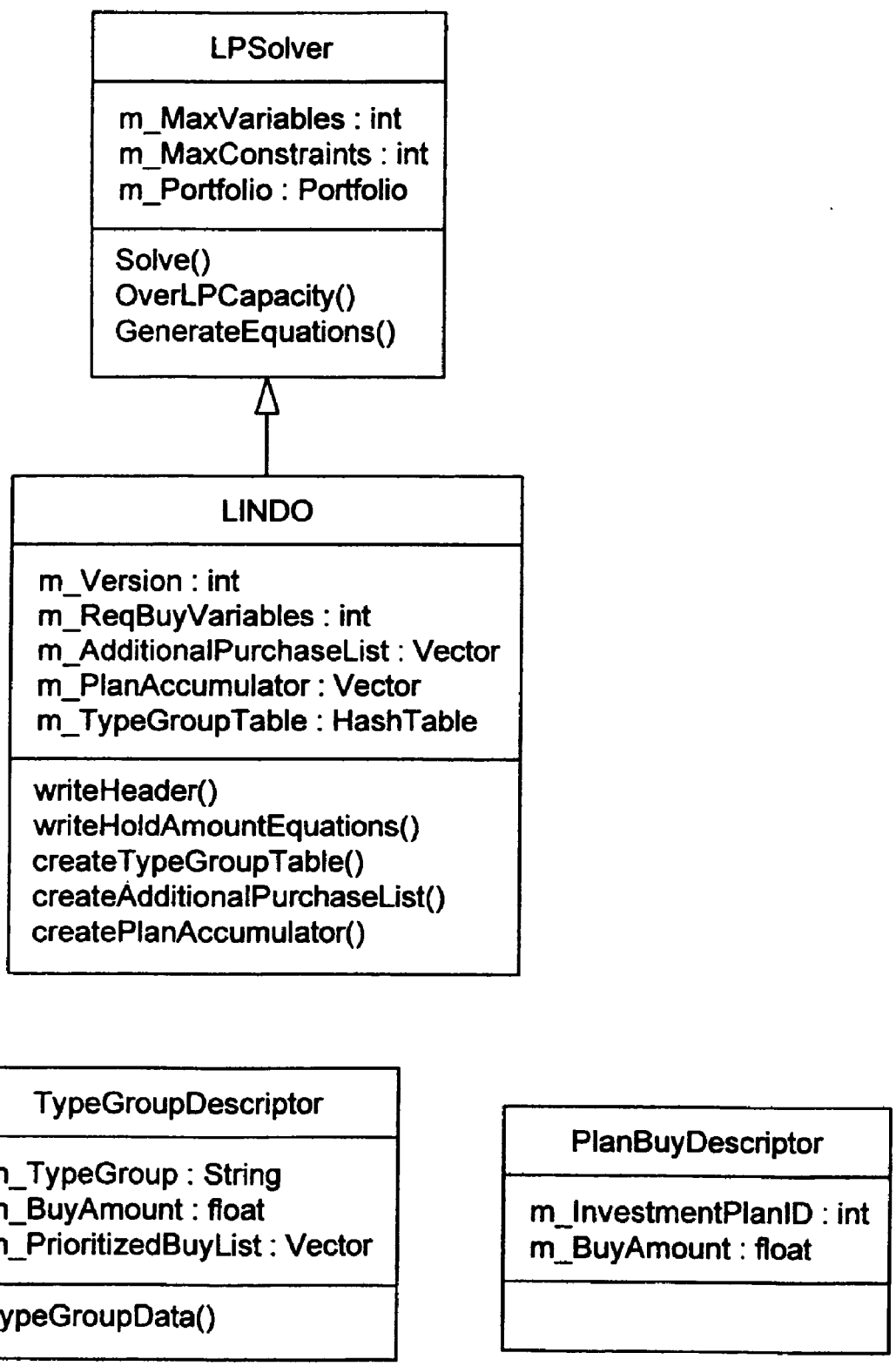

FIG. 8A-1 through FIG. 8H, taken together, provide a detailed, functional data flowchart of the Auto Rebal Model in accordance with the disclosed embodiment of the present invention.

FIGS. 8A-1 and 8A2, taken together, is a flowchart of the overall Auto Rebal Model. The following abbreviations are used in FIGS. 8A-1 and 8A2: VPAS refers to Vanguard Personal Advisory Service, INV refers to Investment, and AR refers to Auto Rebal. "PlanIT" is the name given by Vanguard to a system program used with the present invention. PlanIT is a Sybase database application program. However, the present invention may be practiced with any suitable type of database application program. PlanIT is also referred to in the text of the linear programming (see Appendix below).

FIG. 8B is a flowchart of the analysis process associated with the Auto Rebal Model. TPFS130 refers to a database table which contains the changes to the current portfolio (buys and sells) recommended by Auto Rebal. Other tables identified by the format TPFS# are described in the text of the linear programming (see Appendix below).

FIG. 8C is a flowchart of Auto Rebal Object associated with the Auto Rebal Model. NR refers to "rebalancing is not needed" (see Status Code values in the Appendix).

FIG. 8D is a flowchart associated with portfolio rebalancing in the Auto Rebal Model.

FIG. 8E is a flowchart associated with determining how much of each current asset to sell and/or hold in the Auto Rebal Model.

FIG. 8F is a flowchart associated with determining how to invest proceeds from sales in the Auto Rebal Model.

FIG. 8G is a flowchart associated with determining how to invest proceeds from sales and for building equations for a Buy Model in the Auto Rebal Model. BE refers to "request too large for buy linear programming process" (see Status Code values in the Appendix).

FIG. 8H is a flowchart associated with determining how to invest proceeds from sales and determining which funds to buy. LINDO refers to a linear programming engine used to solve the equations generated by Auto Rebal. The use of other linear programming engines are within the scope of the present invention.

The individual flowcharts are self-explanatory, and thus the individual steps in the flowcharts are not described in further detail herein.

FIGS. 9A through 9H show class diagrams for all of the objects used in the present invention. The class diagrams are self-explanatory, and thus are not described in further detail herein. Additional details of the steps in the flowcharts and of the objects are provided in the linear programming version of the present invention set forth in the APPENDIX.

Figure 10:
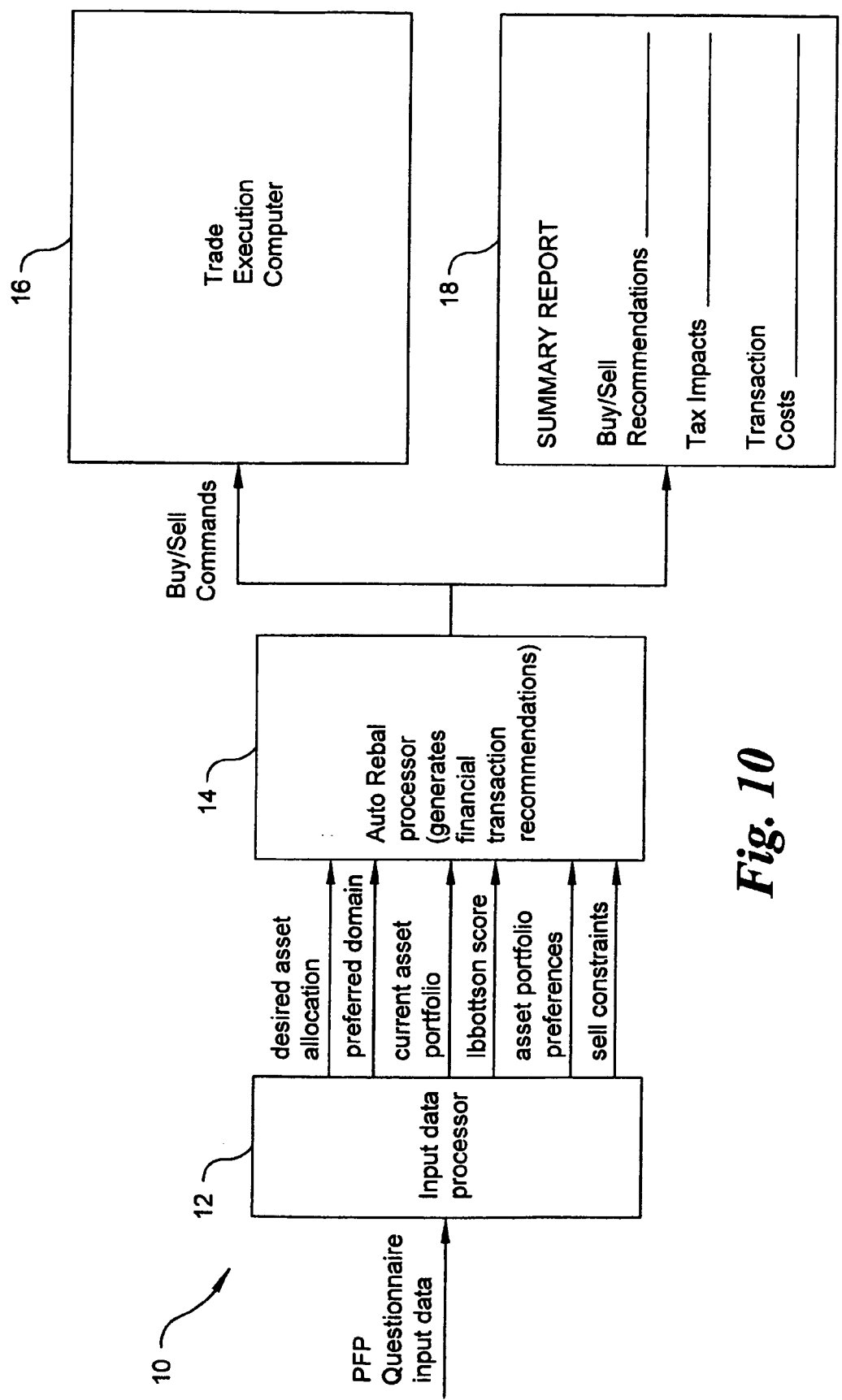
FIG. 10 is a generalized schematic block diagram of the present invention.

FIG. 10 is a schematic block diagram of an apparatus 10 for implementing the Auto Rebal process. The apparatus includes an input data processor 12, an Auto Rebal processor 14, a trade execution computer 16 and a Summary Report 18. PFP questionnaire data are provided to the input data processor 12 which outputs the client's current asset portfolio, asset portfolio preferences, and sell constraints, and calculates and outputs the client's desired asset allocation, preferred domain, and Ibbotson score, and communicates this information to the Auto Rebal processor 14. The Auto Rebal processor 14 uses this information to generate financial transaction recommendations, including asset buy/sell recommendations. In one embodiment of the invention, the recommendations, as well as the tax impacts and transaction costs thereof, are displayed in the Summary Report 18 for review by the client and/or the client's financial manager. In an alternative embodiment of the invention, the buy/sell recommendations are electronically communicated to the trade execution computer 16 which automatically performs the necessary transactions to execute the buy/sell recommendations. The trade execution computer 16 may be any suitable computer for executing trade orders. One example of such a computer is described in U.S. Pat. No. 5,819,238 (Fernholz), the entire disclosure of which is incorporated by reference herein.

As discussed above, the investor would ideally like to rebalance the portfolio without incurring any tax implications or transaction costs. However, selling stock assets almost always has tax implications, and any buying and selling of assets incurs transaction costs which immediately decreases the total assets of the investor. Thus, it is not necessarily beneficial to fully reach the desired asset allocation if doing so would incur excessive transaction costs and/or significant negative tax implications. The present invention addresses these issues in two ways. First, it may be programmed to recommend holding the client's possibly repositionable assets if the client's new asset allocation will be within a predetermined percentage of the desired asset allocation, such as 3%, after selling all of the client's repositionable assets. Furthermore, it may be programmed to recommend selling the client's repositionable assets until the tax cost of selling equals a predetermined percentage of the client's current asset portfolio. Consider, for example, a client who has a desired SAA of 50% equities and 50% bonds and can rebalance from 65% equities and 35% bonds to 48% equities and 52% bonds without incurring any tax consequences, but that significant tax costs as a percentage of the client's current asset portfolio would arise by further rebalancing to the desired 50/50 ratio. In this example, the buy/sell recommendations would be selected to achieve the 48/52 ratio, instead of the 50/50 ratio. The same type of rebalancing limitations may be used with respect to transaction costs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computerized process for automating investment planning for a client comprising:
   (a) inputting into a computer data regarding the client's current asset portfolio, including the taxable status of each asset;
   (b) inputting into a computer data regarding the client's desired asset allocation;
   (c) inputting into a computer data regarding the client's preferred domain;
   (d) using the data in steps (a)–(c) to automatically generate financial transaction recommendations for modifying the client's current asset portfolio to reach as close as possible to the desired asset allocation and the preferred domain, the recommendations including specific recommendations for selling amounts of selected current assets and specific recommendations for buying amounts of one or more investment funds; and
   (e) displaying the recommendations on a summary report for review by the client or the client's financial manager.

2. A process according to claim 1 wherein step (d) includes determining tax impacts of potential sell transactions, the recommendations being selected to minimize the tax impacts.

3. A process according to claim 2 wherein the summary report includes the tax impacts of at least some of the recommendations.

4. A process according to claim 2 further comprising:
   (f) inputting into a computer data regarding the client's asset portfolio preferences, including current assets that the client wishes to hold or sell, and constraints on asset selling, wherein step (d) further includes using the data in step (f) to automatically generate the financial transaction recommendations.

5. A process according to claim 1 wherein step (d) includes determining transaction costs of potential sell transactions, the recommendations being selected to minimize the transaction costs.

6. A process according to claim 5 wherein the summary report includes the transaction costs of at least some of the recommendations.

7. A process according to claim 1 wherein the client's current asset portfolio includes repositionable assets, non-repositionable assets and conditionally repositionable assets, and step (d) includes a recommendation to hold the client's conditionally repositionable assets if the client's new asset allocation will be within a predetermined percentage of the desired asset allocation after selling all of the client's repositionable assets.

8. A process according to claim 7 wherein the predetermined percentage is 3%.

9. A process according to claim 1 wherein the client's current asset portfolio includes repositionable assets, non-repositionable assets and conditionally repositionable assets, and step (d) includes treating the conditionally repositionable assets as non-repositionable assets when making the current asset portfolio modifications.

10. A process according to claim 1 wherein the client's current asset portfolio includes repositionable assets, non-repositionable assets and conditionally repositionable assets, and step (d) includes a recommendation to sell the client's repositionable assets until the tax cost of selling equals a predetermined percentage of the client's current asset portfolio.

11. A process according to claim 1 wherein the recommendations include recommendations to (i) add specific amounts of shares to currently held mutual funds, and (ii) open one or more new mutual funds and contribute specific amounts of shares to the new funds.

12. A process according to claim 1 wherein the desired asset allocation is determined based upon the client's Ibbotson score.

13. A process according to claim 1 wherein step (d) includes developing target portfolio amounts and adjusted target portfolio amounts for each asset category in the desired asset allocation.

14. A process according to claim 1 further comprising:
  (f) inputting information regarding the client which is necessary to determine the client's desired asset allocation and the client's preferred domain; and
  (g) automatically determining the client's desired asset allocation and the client's preferred domain and using the results as the data inputs in steps (b) and (c).

15. A computerized process for automating and executing investment planning for a client comprising:
  (a) inputting into a computer data regarding the client's current asset portfolio, including the taxable status of each asset;
  (b) inputting into a computer data regarding the client's desired asset allocation;
  (c) inputting into a computer data regarding the client's preferred domain;
  (d) using the data in steps (a)–(c) to automatically generate financial transaction recommendations for modifying the client's current asset portfolio to reach as close as possible to the desired asset allocation and the preferred domain, the recommendations including specific recommendations for selling amounts of selected current assets and specific recommendations for buying amounts of one or more investment funds; and
  (e) selling amounts of selected current assets or buying amounts of one or more investment funds in accordance with the specific recommendations.

16. A process according to claim 15 wherein step (d) includes determining tax impacts of potential sell transactions, the recommendations being selected to minimize the tax impacts.

17. A process according to claim 16 wherein the summary report includes the tax impacts of at least some of the recommendations.

18. A process according to claim 16 further comprising:
  (f) inputting into a computer data regarding the client's asset portfolio preferences, including current assets that the client wishes to hold or sell, and constraints on asset selling, wherein step (d) further includes using the data in step (f) to automatically generate the financial transaction recommendations.

19. A process according to claim 15 wherein step (d) includes determining transaction costs of potential sell transactions, the recommendations being selected to minimize the transaction costs.

20. A process according to claim 19 wherein the summary report includes the transaction costs of at least some of the recommendations.

21. A process according to claim 15 wherein the client's current asset portfolio includes repositionable assets, non-repositionable assets and conditionally repositionable assets, and step (d) includes a recommendation to hold the client's conditionally repositionable assets if the client's new asset allocation will be within a predetermined percentage of the desired asset allocation after selling all of the client's repositionable assets.

22. A process according to claim 21 wherein the predetermined percentage is 3%.

23. A process according to claim 15 wherein the client's current asset portfolio includes repositionable assets, non-repositionable assets and conditionally repositionable assets, and step (d) includes treating the conditionally repositionable assets as non-repositionable assets when making the current asset portfolio modifications.

24. A process according to claim 15 wherein the client's current asset portfolio includes repositionable assets, non-repositionable assets and conditionally repositionable assets, and step (d) includes a recommendation to sell the client's repositionable assets until the tax cost of selling equals a predetermined percentage of the client's current asset portfolio.

25. A process according to claim 15 wherein the recommendations include recommendations to (i) add specific amounts of shares to currently held mutual funds, and (ii) open one or more new mutual funds and contribute specific amounts of shares to the new funds.

26. A process according to claim 15 wherein the desired asset allocation is determined based upon the client's Ibbotson score.

27. A process according to claim 15 wherein step (d) includes developing target portfolio amounts and adjusted target portfolio amounts for each asset category in the desired asset allocation.

28. A process according to claim 15 further comprising:
  (f) inputting information regarding the client which is necessary to determine the client's desired asset allocation and the client's preferred domain; and
  (g) automatically determining the client's desired asset allocation and the client's preferred domain and using the results as the data inputs in steps (b) and (c).

29. A process according to claim 15 wherein step (e) further comprises communicating the specific recommendations for selling amounts of selected current assets and specific recommendations for buying amounts of one or more investment funds to a trade execution computer which automatically performs the necessary transactions to execute the buy/sell recommendations.

30. A computer program product including at least one computer readable medium having computer program logic recorded thereon for automating investment planning for a client, the at least one computer readable medium comprising:
  (a) means for inputting into a computer data regarding the client's current asset portfolio, including the taxable status of each asset;
  (b) means for inputting into a computer data regarding the client's desired asset allocation;
  (c) means for inputting into a computer data regarding the client's preferred domain;
  (d) means for automatically generating financial transaction recommendations using the data in (a)–(c) for modifying the client's current asset portfolio to reach as close as possible to the desired asset allocation and the preferred domain, the recommendations including specific recommendations for selling amounts of selected current assets and specific recommendations for buying amounts of one or more investment funds; and
  (e) means for displaying the recommendations on a summary report for review by the client or the client's financial manager.

31. A computer program product according to claim 30 wherein the means for automatically generating financial transaction recommendations includes means for determining tax impacts of potential sell transactions, the recommendations being selected to minimize the tax impacts.

32. A computer program product according to claim 31 wherein the summary report includes the tax impacts of at least some of the recommendations.

33. A computer program product according to claim 31 further comprising:
(f) means for inputting into a computer data regarding the client's asset portfolio preferences, including current assets that the client wishes to hold or sell, and constraints on asset selling, wherein the means for automatically generating financial transaction recommendations uses the data regarding the client's asset portfolio preferences to automatically generate the financial transaction recommendations.

34. A computer program product according to claim 30 wherein the means for automatically generating financial transaction recommendations includes means for determining transaction costs of potential sell transactions, the recommendations being selected to minimize the transaction costs.

35. A computer program product according to claim 34 wherein the summary report includes the transaction costs of at least some of the recommendations.

36. A computer program product according to claim 30 wherein the client's current asset portfolio includes repositionable assets, non-repositionable assets and conditionally repositionable assets, and the means for automatically generating financial transaction recommendations provides a recommendation to hold the client's conditionally repositionable assets if the client's new asset allocation will be within a predetermined percentage of the desired asset allocation after selling all of the client's repositionable assets.

37. A computer program product according to claim 36 wherein the predetermined percentage is 3%.

38. A computer program product according to claim 30 wherein the client's current asset portfolio includes repositionable assets, non-repositionable assets and conditionally repositionable assets, and the means for automatically generating financial transaction recommendations treats the conditionally repositionable assets as non-repositionable assets when making the current asset portfolio modifications.

39. A computer program product according to claim 30 wherein the client's current asset portfolio includes repositionable assets, non-repositionable assets and conditionally repositionable assets, and the means for automatically generating financial transaction recommendations provides a recommendation to sell the client's repositionable assets until the tax cost of selling equals a predetermined percentage of the client's current asset portfolio.

40. A computer program product according to claim 30 wherein the recommendations include recommendations to (i) add specific amounts of shares to currently held mutual funds, and (ii) open one or more new mutual funds and contribute specific amounts of shares to the new funds.

41. A computer program product according to claim 30 wherein the desired asset allocation is determined based upon the client's Ibbotson score.

42. A computer program product according to claim 30 wherein the means for automatically generating financial transaction recommendations includes means for developing target portfolio amounts and adjusted target portfolio amounts for each asset category in the desired asset allocation.

43. A computer program product according to claim 30 further comprising:
(f) means for inputting information regarding the client which is necessary to determine the client's desired asset allocation and the client's preferred domain; and
(g) means for automatically determining the client's desired asset allocation and the client's preferred domain and using the results as the data inputs for the means (a) and (b).

44. A computer program product including at least one computer readable medium having computer program logic recorded thereon for automating investment planning for a client, the at least one computer readable medium comprising:
(a) means for inputting into a computer data regarding the client's current asset portfolio, including the taxable status of each asset;
(b) means for inputting into a computer data regarding the client's desired asset allocation;
(c) means for inputting into a computer data regarding the client's preferred domain;
(d) means for automatically generating financial transaction recommendations using the data in (a)–(c) for modifying the client's current asset portfolio to reach as close as possible to the desired asset allocation and the preferred domain, the recommendations including specific recommendations for selling amounts of selected current assets and specific recommendations for buying amounts of one or more investment funds; and
(e) means for selling amounts of selected current assets or buying amounts of one or more investment funds in accordance with the specific recommendations.

45. A computer program product according to claim 44 wherein the means for automatically generating financial transaction recommendations includes means for determining tax impacts of potential sell transactions, the recommendations being selected to minimize the tax impacts.

46. A computer program product according to claim 45 wherein the summary report includes the tax impacts of at least some of the recommendations.

47. A computer program product according to claim 45 further comprising:
(f) means for inputting into a computer data regarding the client's asset portfolio preferences, including current assets that the client wishes to hold or sell, and constraints on asset selling, wherein the means for automatically generating financial transaction recommendations uses the data regarding the client's asset portfolio preferences to automatically generate the financial transaction recommendations.

48. A computer program product according to claim 44 wherein the means for automatically generating financial transaction recommendations includes means for determining transaction costs of potential sell transactions, the recommendations being selected to minimize the transaction costs.

49. A computer program product according to claim 48 wherein the summary report includes the transaction costs of at least some of the recommendations.

50. A computer program product according to claim 44 wherein the client's current asset portfolio includes repositionable assets, non-repositionable assets and conditionally repositionable assets, and the means for automatically generating financial transaction recommendations provides a recommendation to hold the client's conditionally repositionable assets if the client's new asset allocation will be within a predetermined percentage of the desired asset allocation after selling all of the client's repositionable assets.

51. A computer program product according to claim 50 wherein the predetermined percentage is 3%.

52. A computer program product according to claim 44 wherein the client's current asset portfolio includes repositionable assets, non-repositionable assets and conditionally repositionable assets, and the means for automatically generating financial transaction recommendations treats the conditionally repositionable assets as non-repositionable assets when making the current asset portfolio modifications.

53. A computer program product according to claim 44 wherein the client's current asset portfolio includes repositionable assets, non-repositionable assets and conditionally repositionable assets, and the means for automatically generating financial transaction recommendations provides a recommendation to sell the client's repositionable assets until the tax cost of selling equals a predetermined percentage of the client's current asset portfolio.

54. A computer program product according to claim 44 wherein the recommendations include recommendations to (i) add specific amounts of shares to currently held mutual funds, and (ii) open one or more new mutual funds and contribute specific amounts of shares to the new funds.

55. A computer program product according to claim 44 wherein the desired asset allocation is determined based upon the client's Ibbotson score.

56. A computer program product according to claim 44 wherein the means for automatically generating financial transaction recommendations includes means for developing target portfolio amounts and adjusted target portfolio amounts for each asset category in the desired asset allocation.

57. A computer program product according to claim 44 further comprising:
(f) means for inputting information regarding the client which is necessary to determine the client's desired asset allocation and the client's preferred domain; and
(g) means for automatically determining the client's desired asset allocation and the client's preferred domain and using the results as the data inputs for the means (a) and (b).

58. A computer program product according to claim 44 wherein the means for selling amounts of selected current assets or buying amounts of one or more investment funds in accordance with the specific recommendations is a trade execution computer which is in communication with the means for automatically generating financial transaction recommendations and which automatically performs the necessary transactions to execute the buy/sell recommendations.

59. A process according to claim 1 further comprising:
(f) inputting into a computer data regarding the client's asset portfolio preferences, including current assets that the client wishes to hold or sell, wherein step (d) further includes using the data in step (f) to automatically generate the financial transaction recommendations.

60. A process according to claim 15 further comprising:
(f) inputting into a computer data regarding the client's asset portfolio preferences, including current assets that the client wishes to hold or sell, wherein step (d) further includes using the data in step (f) to automatically generate the financial transaction recommendations.

61. A computer program product according to claim 30 further comprising:
(f) means for inputting into a computer data regarding the client's asset portfolio preferences, including current assets that the client wishes to hold or sell, wherein the means for automatically generating financial transaction recommendations uses the data regarding the client's asset portfolio preferences to automatically generate the financial transaction recommendations.

62. A computer program product according to claim 44 further comprising:
(f) means for inputting into a computer data regarding the client's asset portfolio preferences, including current assets that the client wishes to hold or sell, wherein the means for automatically generating financial transaction recommendations uses the data regarding the client's asset portfolio preferences to automatically generate the financial transaction recommendations.

* * * * *